United States Patent
Prasad Tanniru et al.

(10) Patent No.: US 11,921,764 B2
(45) Date of Patent: Mar. 5, 2024

(54) UTILIZING ARTIFICIAL INTELLIGENCE MODELS TO MANAGE AND EXTRACT KNOWLEDGE FOR AN APPLICATION OR A SYSTEM

(71) Applicant: Accenture Global Solutions Limited, Dublin (IE)

(72) Inventors: Rajendra Prasad Tanniru, Basking Ridge, NJ (US); Aditi Kulkarni, Bangalore (IN); Koushik M Vijayaraghavan, Chennai (IN); Srikanth Prasad, Bangalore (IN); Jayashri Sridevi, Chennai (IN); Roopalaxmi Manjunath, Bangalore (IN); Shankaranand Mallapur, Mumbai (IN); Rajesh Nagarajan, Chennai (IN); Purnima Jagannathan, Chennai (IN); Abhijit Avinash Kulkarni, Erandwane Pune (IN); Joydeep Sarkar, Kolkata (IN); Pareshkumar Ramchandbhai Gelot, Deesa (IN); Sudhir Hanumanthappa, Bengaluru (IN)

(73) Assignee: Accenture Global Solutions Limited, Dublin (IE)

(*) Notice: Subject to any disclaimer, the term of this patent is extended or adjusted under 35 U.S.C. 154(b) by 670 days.

(21) Appl. No.: 16/817,086

(22) Filed: Mar. 12, 2020

(65) Prior Publication Data
US 2021/0286832 A1    Sep. 16, 2021

(51) Int. Cl.
*G06F 16/00*     (2019.01)
*G06F 7/00*      (2006.01)
(Continued)

(52) U.S. Cl.
CPC .......... *G06F 16/3344* (2019.01); *G06F 16/35* (2019.01); *G06N 5/02* (2013.01); *G06N 20/00* (2019.01)

(58) Field of Classification Search
CPC ..... G06F 16/3344; G06F 16/35; G06N 20/00; G06N 5/02
(Continued)

(56) References Cited

U.S. PATENT DOCUMENTS

| 10,482,384 B1 | 11/2019 | Stoilos et al. | |
| 2008/0183668 A1* | 7/2008 | Bhamidipaty | G06F 16/3338 707/E17.061 |

(Continued)

*Primary Examiner* — Raquel Perez-Arroyo
(74) *Attorney, Agent, or Firm* — Harrity & Harrity, LLP

(57) ABSTRACT

A device may receive, in near-real time, unstructured data associated with an application or a system, and may extract textual data from the unstructured data. The device may parse the textual data to generate parsed textual data, and may perform natural language processing on the parsed textual data to generate processed textual data. The device may process the processed textual data, with a clustering model, to identify topical data associated with the processed textual data, and may process the topical data, with a classification model, to group the topical data into categories. The device may generate a knowledge graph based on the categories, and may store the knowledge graph in a data structure. The knowledge graph may enable the device to provide answers to questions associated with the application or the system.

20 Claims, 19 Drawing Sheets

(51) Int. Cl.
  *G06F 16/33*  (2019.01)
  *G06F 16/35*  (2019.01)
  *G06N 5/02*   (2023.01)
  *G06N 20/00*  (2019.01)
(58) Field of Classification Search
  USPC .......................................................... 707/769
  See application file for complete search history.

(56) References Cited

U.S. PATENT DOCUMENTS

| | | | |
|---|---|---|---|
| 2016/0103932 A1* | 4/2016 | Sathish | G06F 3/04883 |
| | | | 715/767 |
| 2017/0300565 A1 | 10/2017 | Calapodescu et al. | |
| 2019/0066031 A1* | 2/2019 | Hancock | G06N 5/04 |
| 2019/0332620 A1 | 10/2019 | Wason et al. | |
| 2019/0347282 A1* | 11/2019 | Cai | G06K 9/6215 |

\* cited by examiner

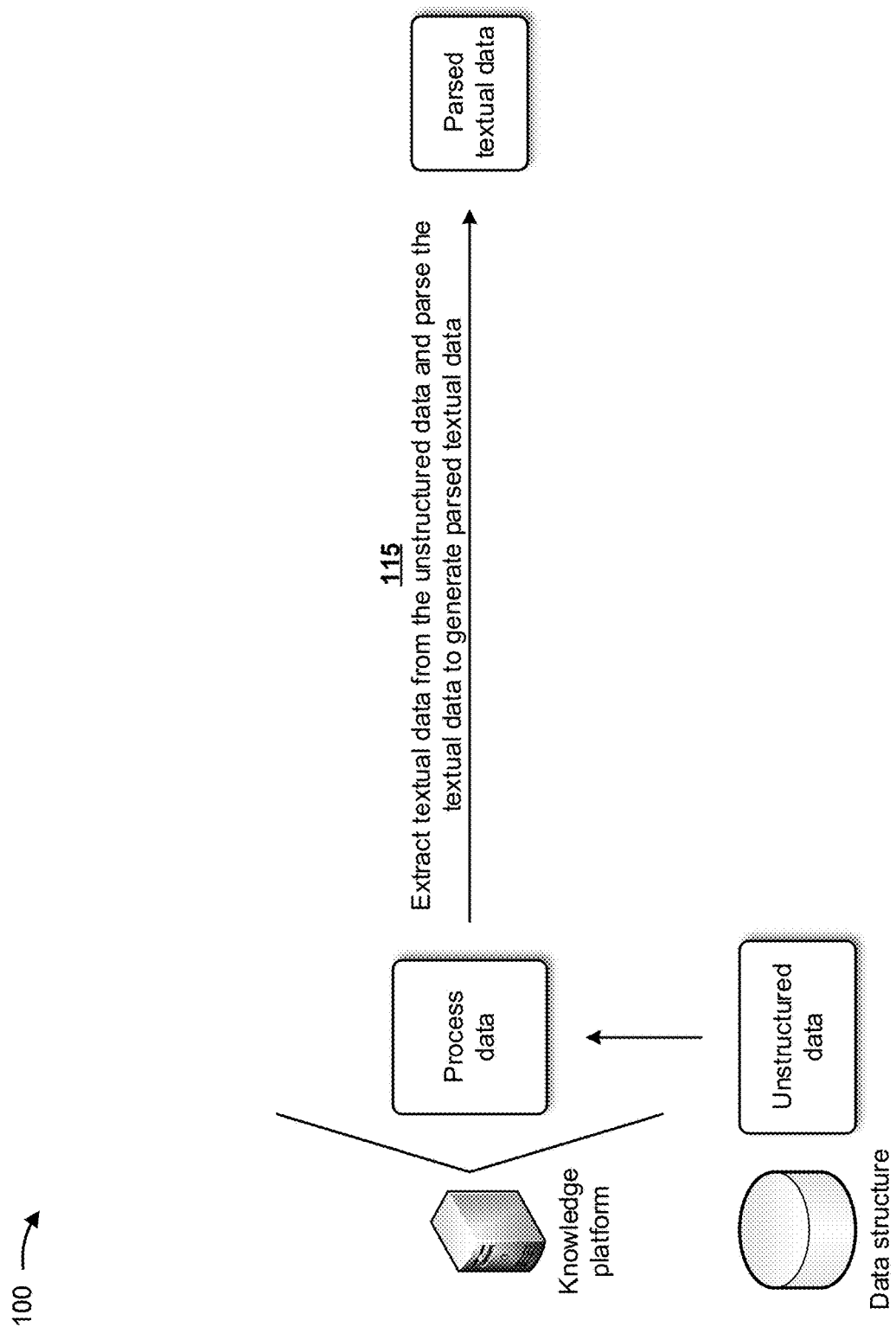

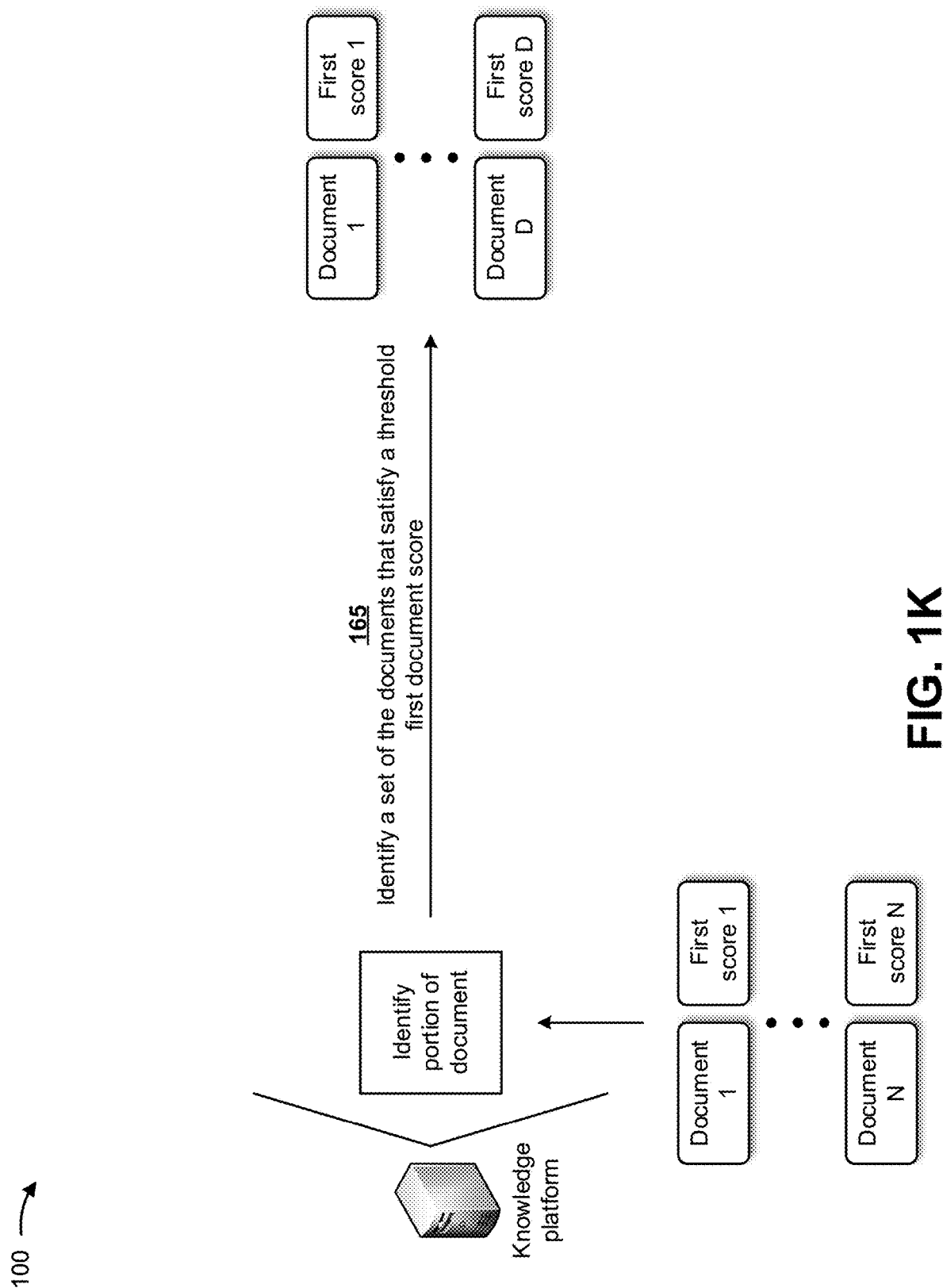

UTILIZING ARTIFICIAL INTELLIGENCE MODELS TO MANAGE AND EXTRACT KNOWLEDGE FOR AN APPLICATION OR A SYSTEM

BACKGROUND

Some entities handle small to large scale application and/or system outsourcing and/or maintenance projects on behalf of clients. Such projects may involve transitioning multiple applications and/or systems from the clients and/or vendors of the clients.

SUMMARY

According to some implementations, a method may include receiving, in near-real time, unstructured data associated with an application or a system, and extracting textual data from the unstructured data. The method may include parsing the textual data to generate parsed textual data, and performing natural language processing on the parsed textual data to generate processed textual data. The method may include processing the processed textual data, with a clustering model, to identify topical data associated with the processed textual data, and processing the topical data, with a classification model, to group the topical data into categories. The method may include generating a knowledge graph based on the categories, and storing the knowledge graph in a data structure, wherein the knowledge graph may enable a device to provide answers to questions associated with the application or the system.

According to some implementations, a device may include one or more memories, and one or more processors to receive, in near-real time, unstructured data associated with an application or a system, and extract textual data from the unstructured data. The one or more processors may parse the textual data to generate parsed textual data, and may perform natural language processing on the parsed textual data to generate processed textual data. The one or more processors may process the processed textual data, with a clustering model, to identify topical data associated with the processed textual data, wherein the clustering model may be trained based on historical textual data associated with applications or systems and based on historical topical data associated with the applications or the systems. The one or more processors may process the topical data, with a classification model, to group the topical data into categories, wherein the classification model may be trained based on the historical topical data associated with the applications or the systems and based on historical category data associated with the applications or the systems. The one or more processors may generate a knowledge graph based on the categories, and may store the knowledge graph in a data structure, wherein the knowledge graph may enable the device to provide answers to questions associated with the application or the system.

According to some implementations, a non-transitory computer-readable medium may store one or more instructions that, when executed by one or more processors of a device, may cause the one or more processors to receive a question associated with an application or a system, and perform a search of a knowledge graph, based on the question, to determine an answer to the question. Unstructured data associated with the application or the system may be processed to generate processed textual data, and the processed textual data may be processed, with a clustering model and a classification model, to generate the knowledge graph. The one or more instructions may cause the one or more processors to perform one or more actions based on the answer to the question.

DETAILED DESCRIPTION

Figure 1A:
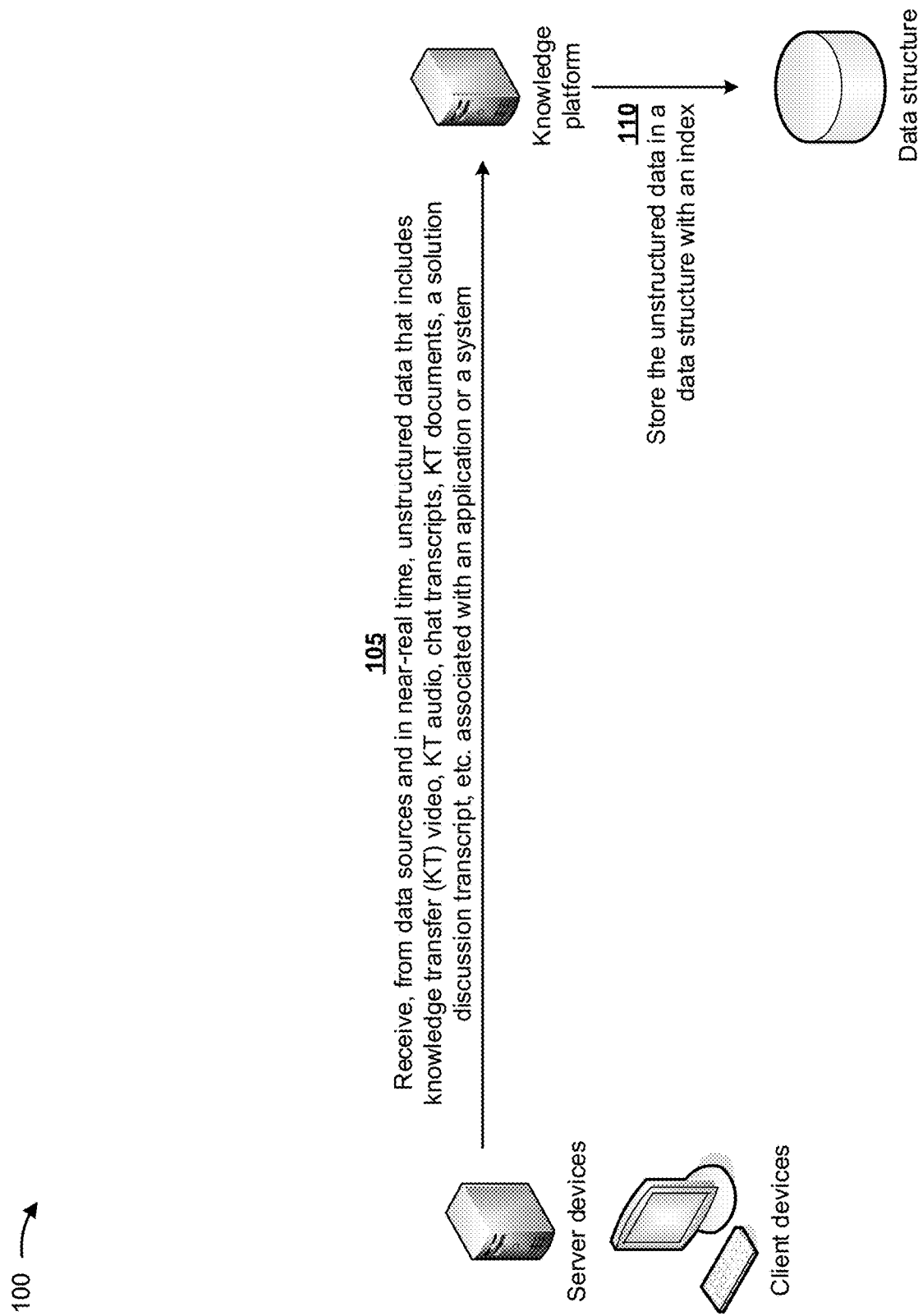
FIGS. 1A-1N are diagrams of one or more example implementations described herein.

The following detailed description of example implementations refers to the accompanying drawings. The same reference numbers in different drawings may identify the same or similar elements.

Currently, when a client or a vendor of a client transitions an application and/or a system to an entity for management, improvement, and/or the like, the entity must first develop an understanding of the application/system during a knowledge transition phase. The entity may face several issues during this phase. For example, documentation (e.g., a user manual) for the application/system may be unavailable; information associated with maintenance of the application/system, execution of the application/system, and modifications made to the application/system may be unavailable; large quantities of documentation about the application/system may be available but may be difficult to review and/or understand; a single source of actual knowledge of the application/system may be absent; and/or the like. Thus, current techniques for understanding an application/system may waste computing resources (e.g., processing resources, memory resources, communication resources, and/or the like), networking resources, human resources, and/or the like associated with executing the application/system to understand features of the application/system, reviewing large quantities of difficult to understand documentation, attempting to piece application/system documents together to understand the application/system, and/or like.

Some implementations described herein provide a knowledge platform that utilizes artificial intelligence models to manage and extract knowledge for an application or a system. For example, the knowledge platform may receive, in near-real time, unstructured data associated with an application or a system, and may extract textual data from the unstructured data. The knowledge platform may parse the textual data to generate parsed textual data, and may perform natural language processing on the parsed textual data to generate processed textual data. The knowledge platform may process the processed textual data, with a clustering model, to identify topical data associated with the processed textual data, and may process the topical data, with a classification model, to group the topical data into categories. The knowledge platform may generate a knowledge graph based on the categories, and may store the knowledge graph in a data structure. The knowledge graph may enable the knowledge platform to provide answers to questions associated with the application or the system.

In this way, the knowledge platform utilizes artificial intelligence models to manage and extract knowledge for an application or a system. The knowledge platform may receive and understand application/system information in many different forms, may assimilate the application/system information, and may provide responses to questions about the application/system. The knowledge platform may receive information about the application/system in real time and/or near-real time, even when such information is available via conversations, calls, chats, video, and/or the like. This, in turn, conserves computing resources, networking resources, and/or the like that would otherwise be wasted in executing the application to understand features of the application/system, reviewing large quantities of difficult to understand documentation, attempting to piece application/system documents together to understand the application/system, and/or like.

Figure 1C:
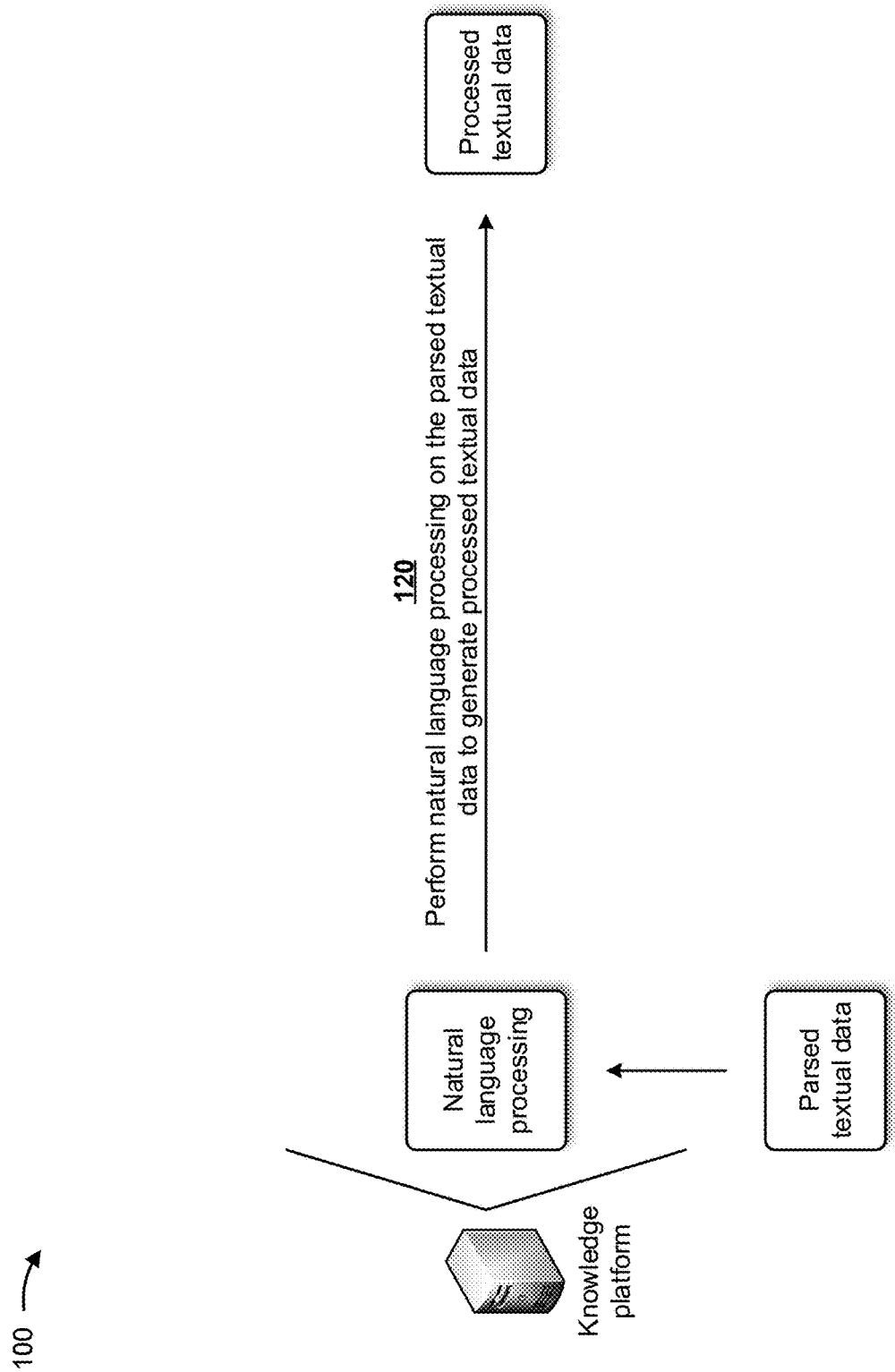
Figure 1D:
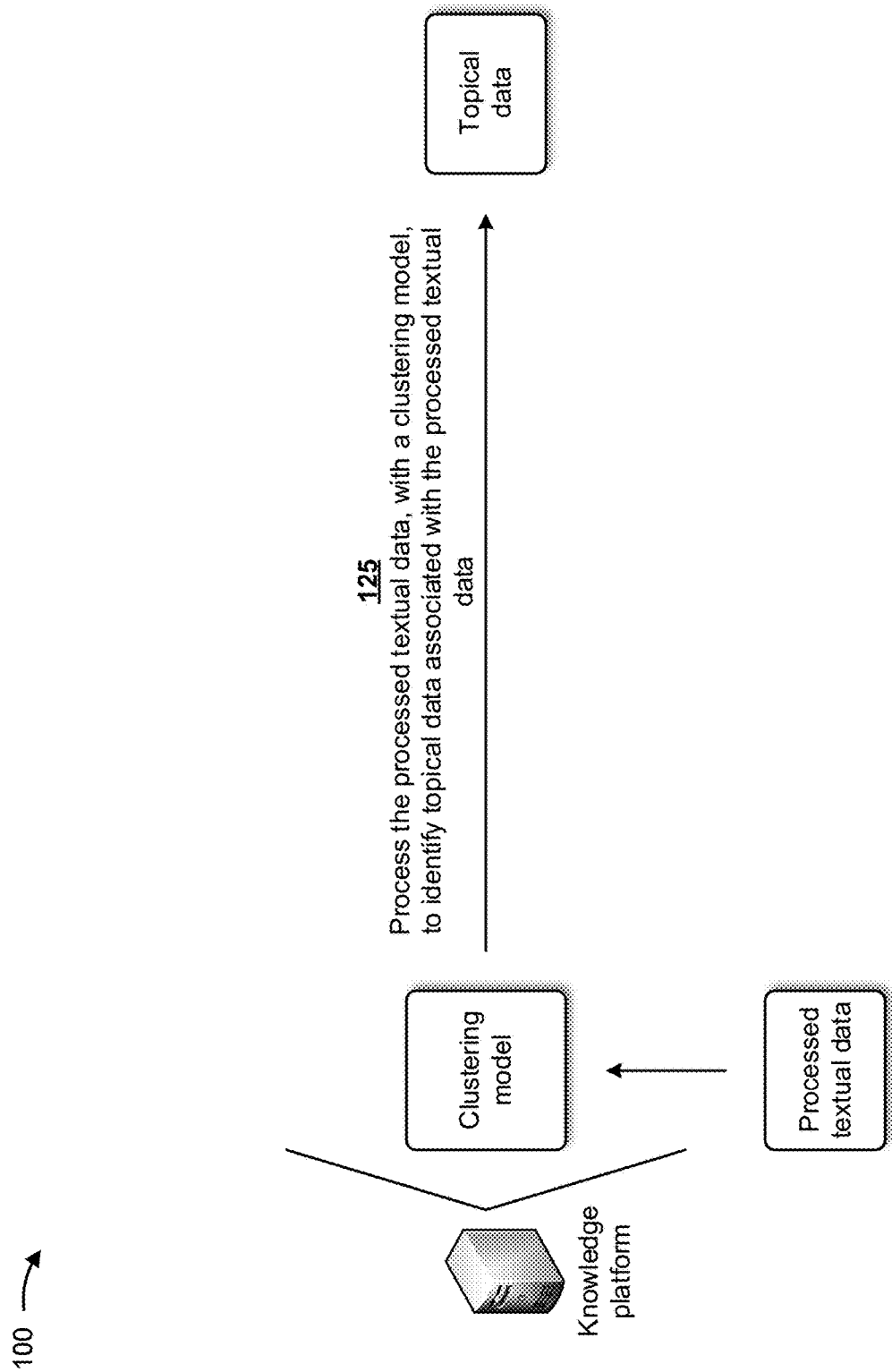
Figure 1E:
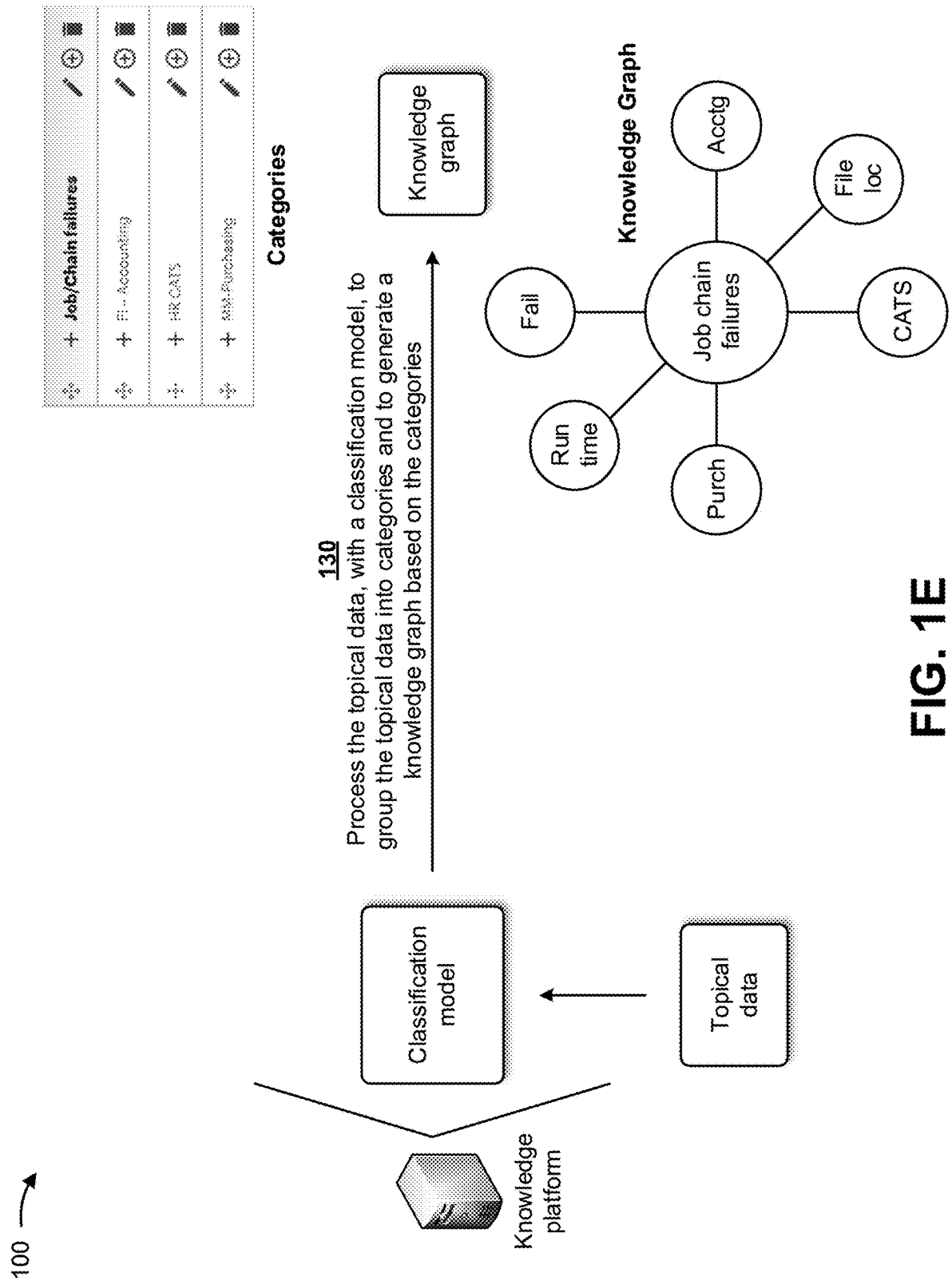
Figure 1F:
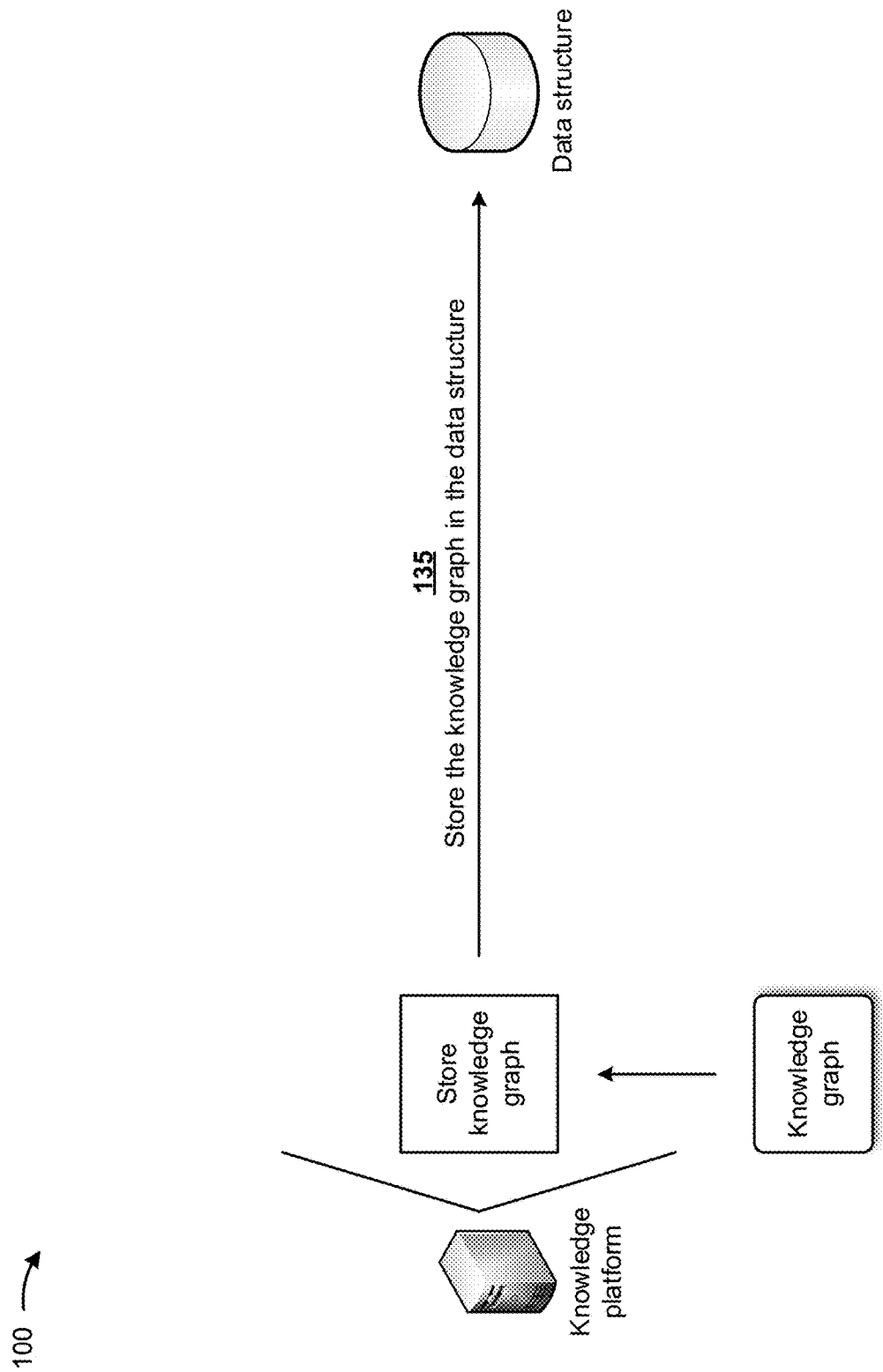
Figure 1G:
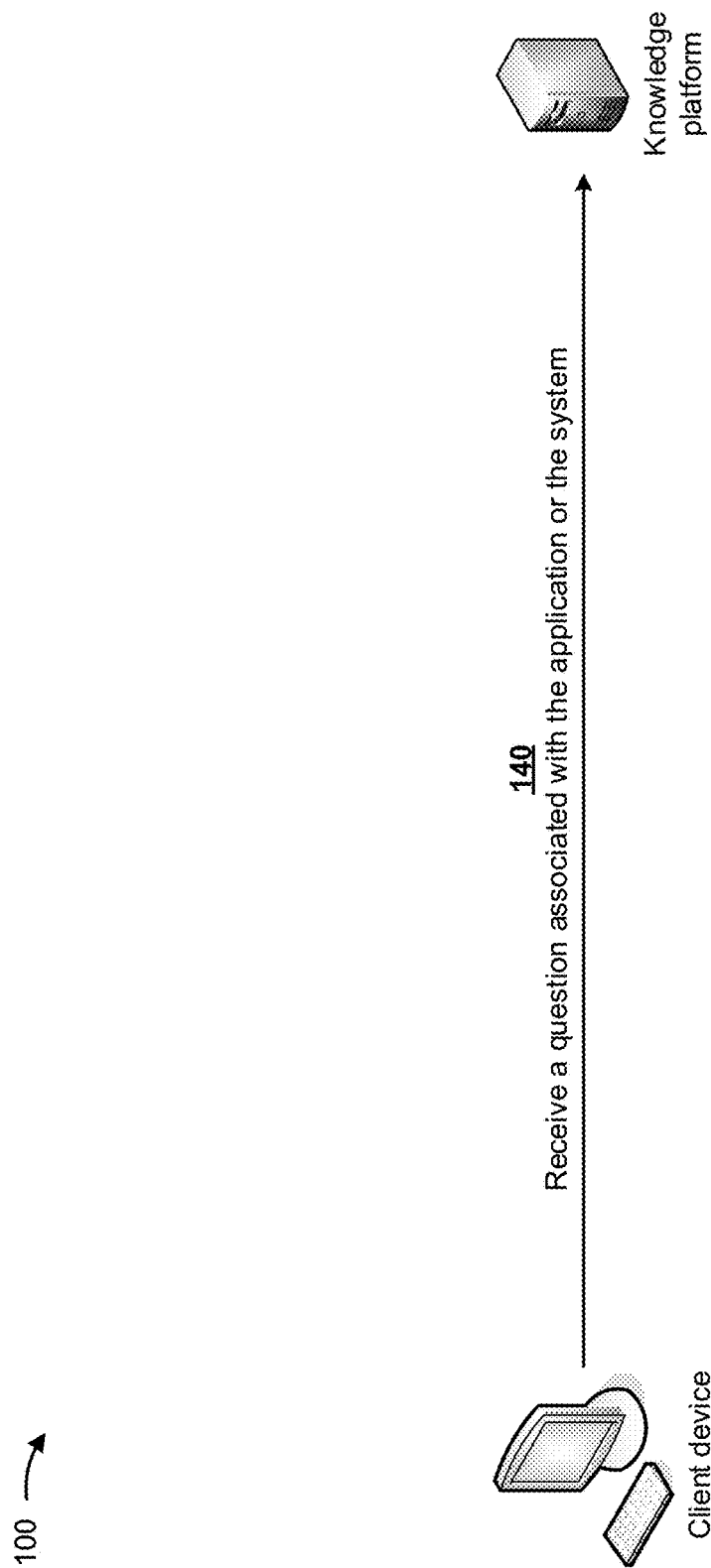
Figure 1H:
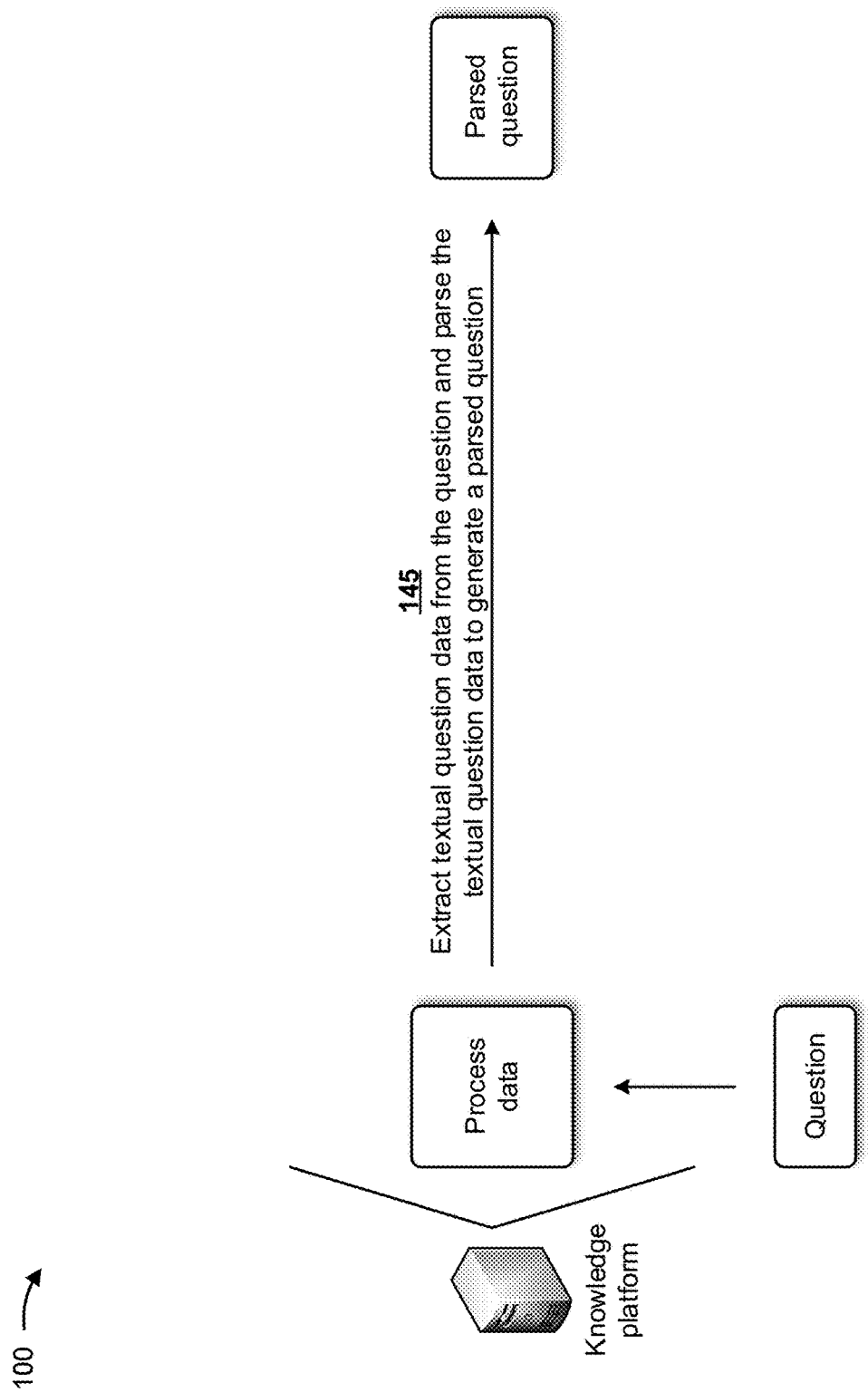
Figure 1I:
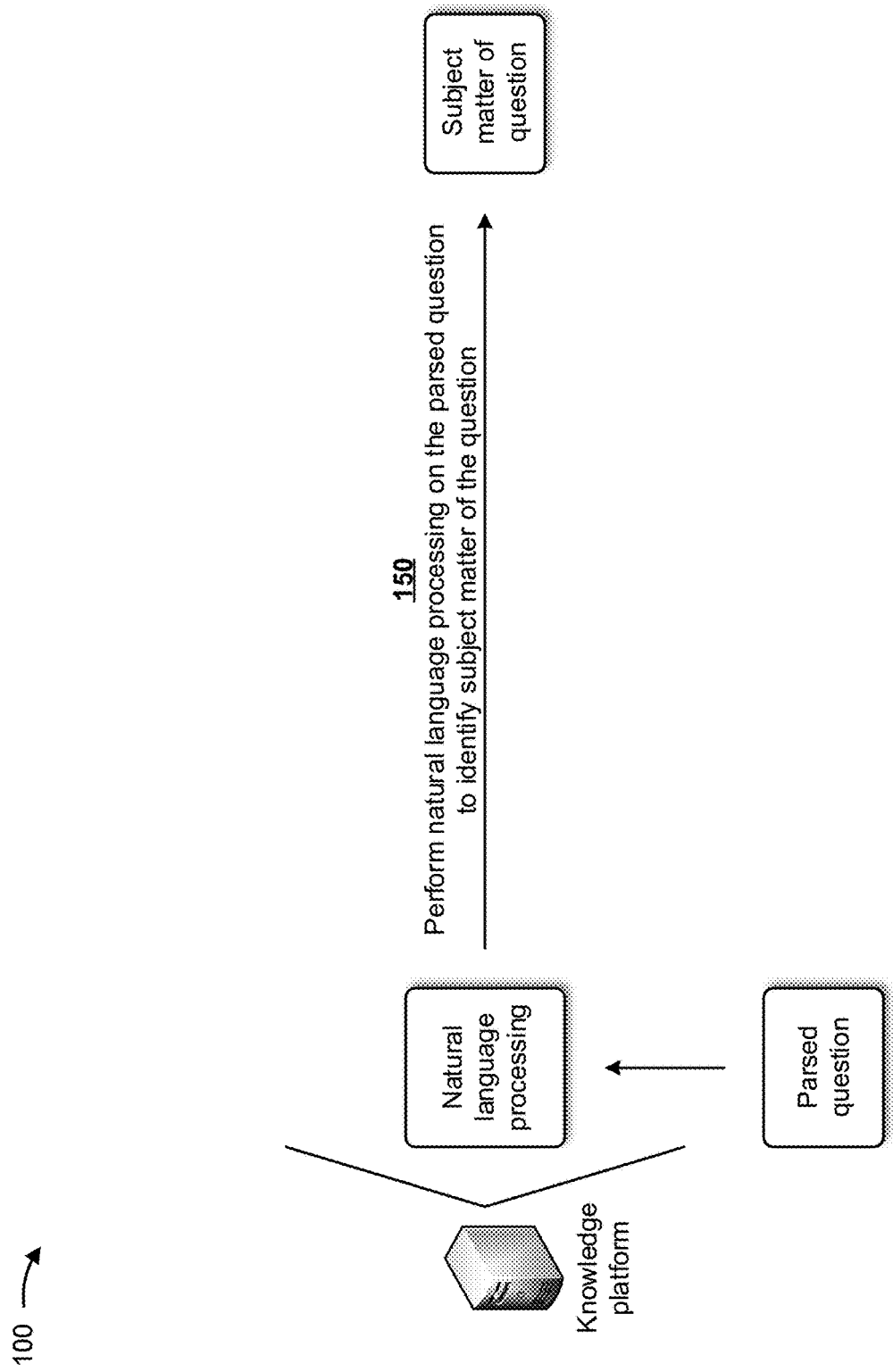
Figure 1J:
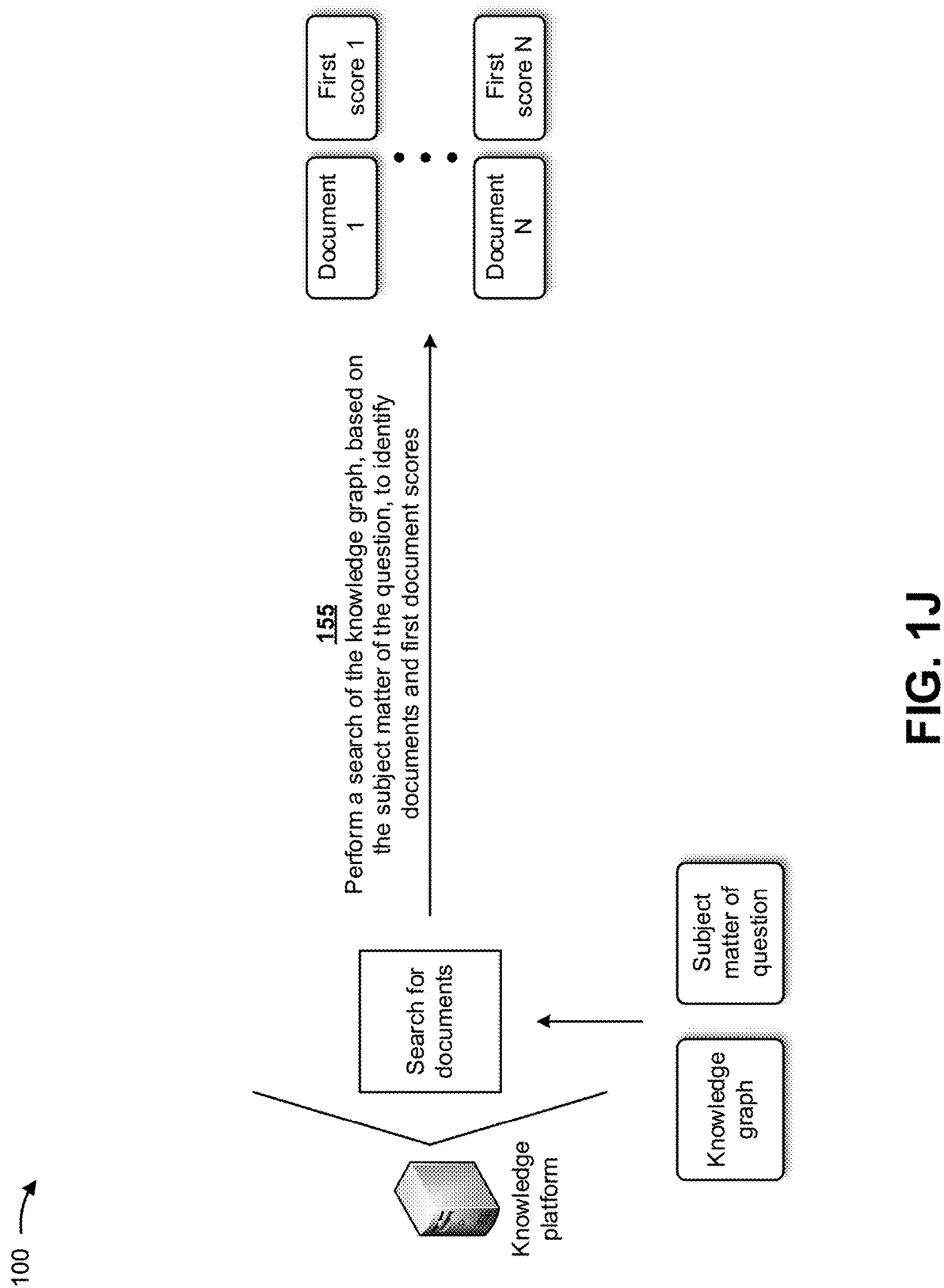
Figure 1L:
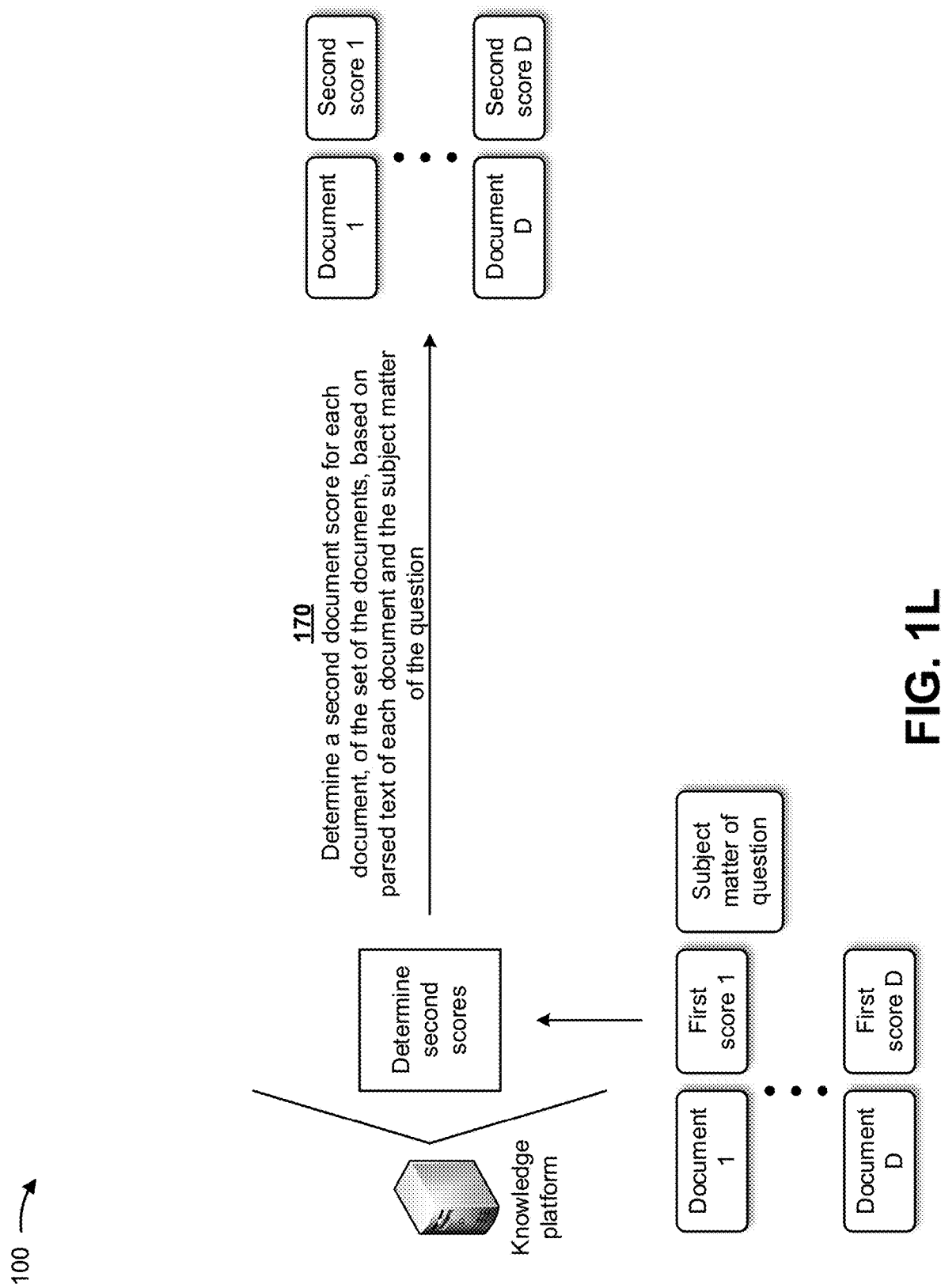
Figure 1M:
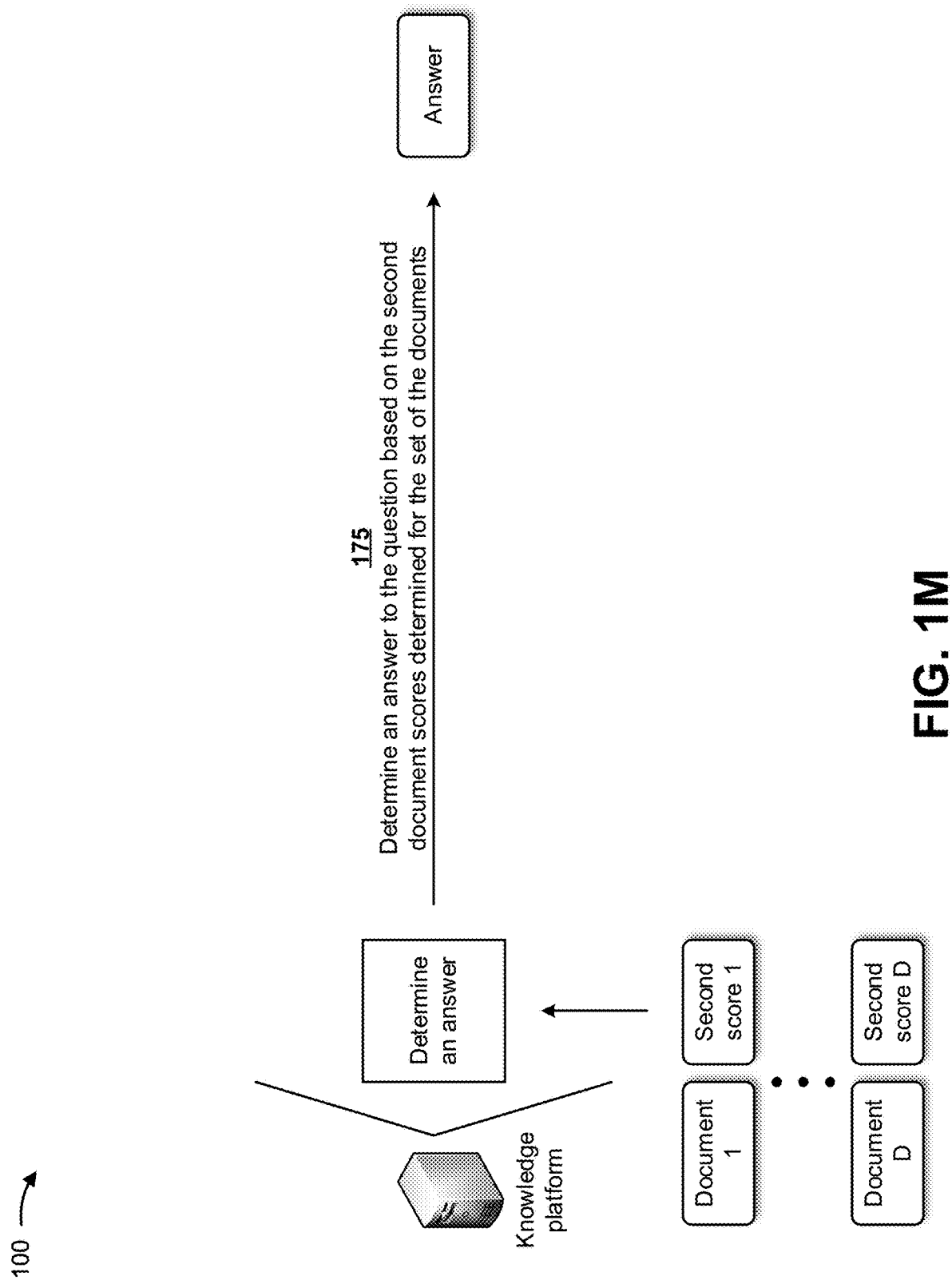
Figure 1N:
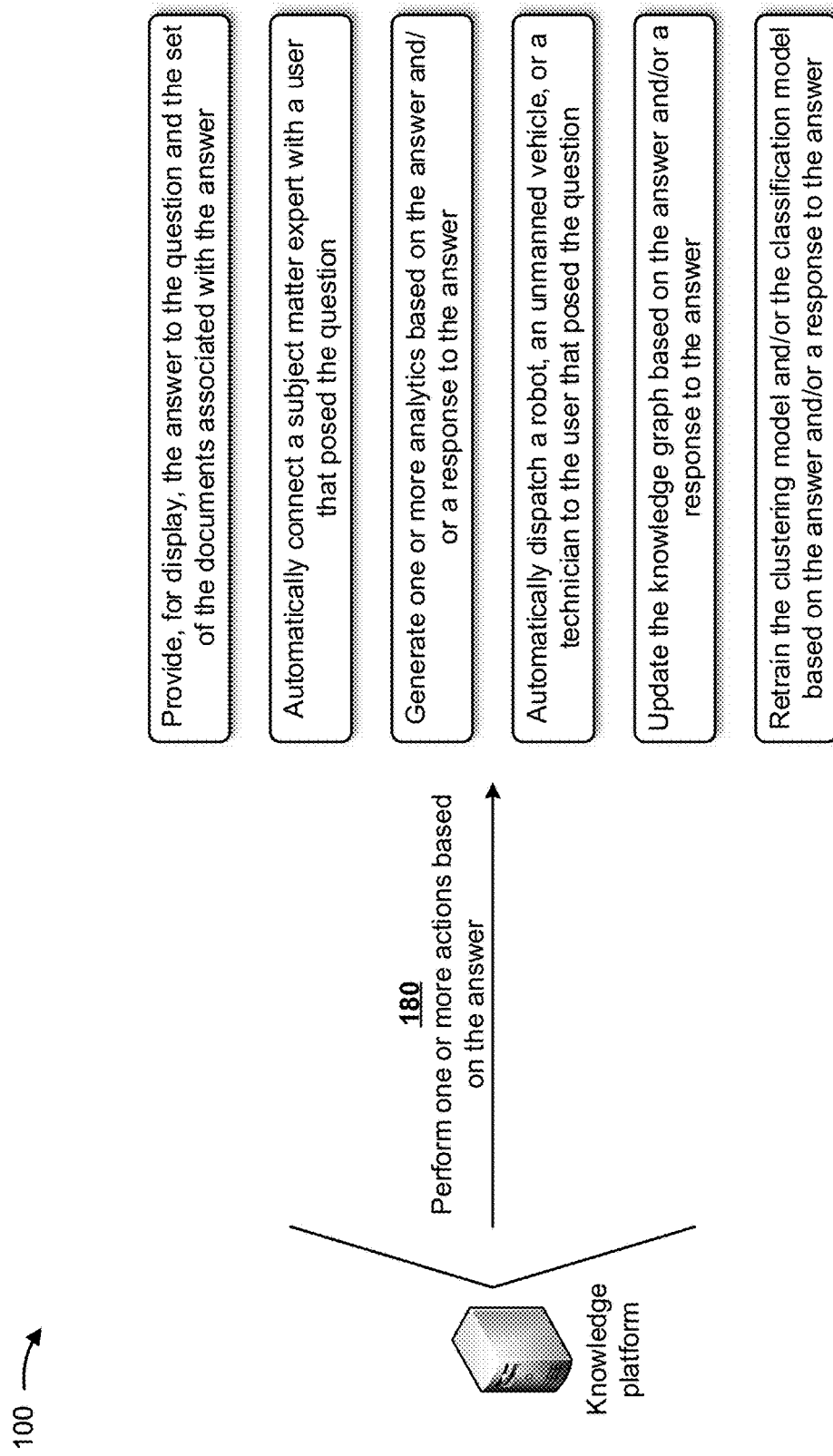

FIGS. 1A-1N are diagrams of one or more example implementations 100 described herein. As shown in FIG. 1A, one or more client devices may be associated with one or more server devices and a knowledge platform. The client devices may include mobile devices, computers, and/or the like associated with employees of an entity (e.g., a business, a financial institution, a government agency, and/or the like) that utilizes one or more applications and/or one or more systems. The server devices may include one or more devices associated with the entity and that store the one or more applications and/or data associated with the one or more applications and/or the one or more systems. The knowledge platform may include a platform that utilizes artificial intelligence models to manage and extract knowledge regarding an application or a system, as described herein.

As further shown in FIG. 1A, and by reference number 105, the knowledge platform may receive, from data sources (e.g., the client devices and the server devices) and in near-real time, unstructured data that includes knowledge transfer (KT) video (e.g., a video that provides knowledge about an application or a system), KT audio, chat transcripts, KT documents, a solution discussion transcript, and/or the like associated with an application or a system. In some implementations, the unstructured data may include video data associated with the application or the system, image data associated with the application or the system, audio data associated with the application or the system, conversation data associated with the application or the system, documents associated with the application or the system, source code associated with the application or the system, emails associated with the application or the system, and/or the like. In one example, the unstructured data may include KT conversation recordings (e.g., conversations between software developers, system engineers, and/or the like about the application or the system), KT documents (e.g., documents generated by software developers, system engineers, and/or the like about the application or the system), solution discussion transcripts (e.g., solutions to problems about the application or the system), project documents (e.g., design documents, test cases, build artifacts, and/or the like), source code, project emails, chat transcripts, audio of chats, and/or the like.

As further shown in FIG. 1A, and by reference number 110, the knowledge platform may store the unstructured data in a data structure (e.g., associated with the knowledge platform) with an index. In some implementations, the knowledge platform may receive the unstructured data from the data sources, and may perform natural language processing on the unstructured data to generate processed data. In such implementations, the knowledge platform may store the processed data in the data structure with indexing. The indexing may enable the knowledge platform to quickly and easily locate and retrieve the unstructured data from the data structure.

As shown in FIG. 1B, and by reference number 115, the knowledge platform may extract textual data from the unstructured data, and may parse the extracted textual data to generate parsed textual data. In some implementations, the knowledge platform may perform optical character recognition (OCR) on images to extract textual data from the images; may transcribe audio data from a video to extract textual data from the video; may transcribe audio data from chats to extract textual data from the chats; may extract pertinent textual data (e.g., relevant to the application or the system) from machine-readable documents (e.g., project documents); may extract pertinent textual data from the textual data extracted from the images, the video, the chats, and/or the like; may extract textual data from the source code and the project emails; and/or the like.

In some implementations, the knowledge platform may utilize a parser application programming interface (API) to parse the extracted textual data and to generate the parsed textual data. The knowledge platform may utilize a tokenizer to tokenize one or more words or phrases included in the extracted textual data, where the one or more tokenized words or phrases may represent the parsed textual data. In some implementations, the knowledge platform may utilize natural language processing to parse the one or more words or phrases included in the extracted textual data into the one or more tokenized words or phrases.

As shown in FIG. 1C, and by reference number 120, the knowledge platform may perform natural language processing on the parsed textual data to generate processed textual data. In some implementations, the processed textual data may include the textual data in a format that may be utilized by a clustering model, as described below in connection with FIG. 1D. In some implementations, the knowledge platform may remove stop words from the parsed textual data, may pre-process the parsed textual data, may apply lemmatization to the parsed textual data, may create a set of resultant keywords for each sentence in the document, and/or the like in order to generate the processed textual data. In some implementations, when performing the natural language processing on the parsed textual data, the knowledge platform may remove punctuations from the parsed textual data, may tokenize words in the parsed textual data to enable analysis of the words, may remove sentences with less than a predetermined quantity of words from the parsed textual data, may determine most frequent keywords utilized in the parsed textual data, and/or the like. When performing the natural language processing on the parsed textual data, the knowledge platform may convert the parsed textual data into machine-readable text, may split the machine-readable text into an array of words, may split the array of words into sequences of contiguous words, may calculate word scores for the sequences of contiguous words, and/or the like.

In some implementations, the knowledge platform may perform at least a portion of the natural language processing using a machine learning model. In this case, the knowledge platform may train the machine learning model with historical data (e.g., historical parsed textual data) to enable the machine learning model to generate the processed textual data. For example, the knowledge platform may train the machine learning model in a manner similar to the clustering model described below in connection with FIG. 1D. In some implementations, rather than training the machine learning model, the knowledge platform may obtain the machine learning model from another system or device that trained the machine learning model. In this case, the knowledge platform may provide the other system or device with historical data for use in training the machine learning model, and may provide the other system or device with updated historical data to retrain the machine learning model in order to update the machine learning model.

As shown in FIG. 1D, and by reference number 125, the knowledge platform may process the processed textual data, with a clustering model, to identify topical data associated with the processed textual data. In some implementations, the topical data may include data identifying topics associated with the application or the system. In one example, the topics may relate to failures in the application or the system, runtime errors in the application or the system, software modules of the application, test results for the application or the system, and/or the like. The clustering model may include a machine learning model that groups similar information together using topic modelling techniques. In some implementations, the knowledge platform may train the clustering model with historical data (e.g., historical textual data associated with applications or systems and historical topical data associated with the applications or the systems) to enable the clustering model to identify topical data associated with the processed textual data. In some implementations, the knowledge platform may separate the historical data into a training set, a validation set, a test set, and/or the like. The training set may be utilized to train the clustering model. The validation set may be utilized to validate results of the trained clustering model. The test set may be utilized to test operation of the trained clustering model.

In some implementations, the knowledge platform may train the clustering model using, for example, an unsupervised training procedure and based on the historical data. For example, the knowledge platform may perform dimensionality reduction to reduce the historical data to a minimum feature set, thereby reducing resources (e.g., processing resources, memory resources, and/or the like) to train the clustering model, and may apply a classification technique to the minimum feature set.

In some implementations, the knowledge platform may use a logistic regression classification technique to determine a categorical outcome (e.g., particular topics associated with the processed textual data). Additionally, or alternatively, the knowledge platform may use a naïve Bayesian classifier technique. In this case, the knowledge platform may perform binary recursive partitioning to split the historical data into partitions and/or branches, and use the partitions and/or branches to determine outcomes (e.g., particular topics associated with the processed textual data). Based on using recursive partitioning, the knowledge platform may reduce utilization of computing resources relative to manual, linear sorting and analysis of data points, thereby enabling use of thousands, millions, or billions of data points to train the clustering model, which may result in a more accurate clustering model than using fewer data points.

Additionally, or alternatively, the knowledge platform may use a support vector machine (SVM) classifier technique to generate a non-linear boundary between data points in the training set. In this case, the non-linear boundary is used to classify test data into a particular class.

Additionally, or alternatively, the knowledge platform may train the clustering model using a supervised training procedure that includes receiving input to the clustering model from a subject matter expert, which may reduce an amount of time, an amount of processing resources, and/or the like to train the clustering model relative to an unsupervised training procedure.

In some implementations, the knowledge platform may use one or more other model training techniques, such as a latent semantic indexing technique, and/or the like. For example, the knowledge platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained clustering model generated by the knowledge platform by making the clustering model more robust to noisy, imprecise, or incomplete data, and by enabling the knowledge platform to detect patterns and/or trends undetectable to human analysts or systems using less complex techniques.

In some implementations, rather than training the clustering model, the knowledge platform may obtain the trained clustering model from another system or device that trained the clustering model to generate the trained clustering model. In this case, the knowledge platform may provide the other system or device with the historical data for use in training the clustering model, and may provide the other system or device with updated historical data to retrain the clustering model in order to update the trained clustering model.

As shown in FIG. 1E, and by reference number 130, the knowledge platform may process the topical data, with a classification model, to group the topical data into categories and to generate a knowledge graph based on the categories. For example, the classification model may include a model that places topics associated with the topical data into the categories. In some implementations, the knowledge platform may define each category (e.g., Job/Chain failures, as shown in FIG. 1E) of the categories, may classify a set of topics (e.g., FI-Accounting, HR CATS, MM-Purchasing, and/or the like, as shown in FIG. 1E) into each category, and may generate a knowledge graph (e.g., as shown in FIG. 1E) based on the categories and the topics. In some implementations, the knowledge platform may arrange data identifying the categories and the topics in a hierarchical format (e.g., a tree data structure) and may store the data identifying the categories and the topics (e.g., the knowledge graph) in the hierarchical format.

In some implementations, the knowledge graph may include parent nodes representing the categories, and child nodes representing topics included in the topical data. Each child node may be connected to one or more parent nodes. In some implementations, the knowledge graph may include a network of nodes with each node representing textual data or groups of textual data. Each node (e.g., the textual data) may be stored along with an artifact name associated with an artifact from which the textual data was extracted. For example, the artifacts may include word documents, text files, images, audio files, video files, and/or the like. In some implementations, the knowledge platform may group textual data into topics in child nodes based on a cosine similarity; may allow a user to edit and/or override topics determined by the knowledge platform, relationships between nodes determined by the knowledge platform, and/or the like; and/or the like.

In some implementations, the knowledge platform may train the classification model with historical data (e.g., historical topical data associated with the applications or the systems and historical category data associated with the applications or the systems) to enable the classification model to generate the knowledge graph, as described herein. For example, the knowledge platform may train the classification model in a manner similar to the clustering model described above in connection with FIG. 1D. In some implementations, rather than training the classification model, the knowledge platform may obtain the classification model from another system or device that trained the classification model. In this case, the knowledge platform may provide the other system or device with historical data for use in training the classification model, and may provide the other system or device with updated historical data to retrain the classification model in order to update the classification model.

As shown in FIG. 1F, and by reference number 135, the knowledge platform may store the knowledge graph in the data structure. In this way, the knowledge platform may create a structured correlated knowledge base (e.g., the knowledge graph) from the unstructured data that is received by the knowledge platform. Furthermore, this may enable the knowledge platform to curate the unstructured data so that changes in the unstructured data may be implemented with respect to the topics, thereby enabling most recent information to be available for answering user queries, as described below.

As shown in FIG. 1G, and by reference number 140, the knowledge platform may receive, from a client device, a question associated with the application or the system. For example, the knowledge platform may receive (e.g., via the client device) the question from a user of the knowledge platform, a user associated with the application or the system, and/or the like. In some implementations, the question may be in the form of a natural language question, a query, and/or the like, and may be received via a textual input, a chat interface, a voice interface, and/or the like. For example, the user may utilize the client device to speak the question, and the client device may provide the spoken question to the knowledge platform.

As shown in FIG. 1H, and by reference number 145, the knowledge platform may extract textual question data from the question and parse the textual question data to generate a parsed question. In some implementations, the knowledge platform may extract the textual question data from the question using a technique similar to the technique described above in connection with FIG. 1B. For example, the knowledge platform may perform OCR on an image to extract the textual question data from the image, may transcribe audio data from a video to extract the textual question data from the video, may transcribe audio data from a chat to extract the textual question data from the chat, and/or the like.

In some implementations, the knowledge platform may parse the textual question data to generate the parsed question using a technique similar to the technique described above in connection with FIG. 1B. For example, the knowledge platform may utilize a parser API to parse the textual question data and to generate the parsed question. The knowledge platform may utilize a tokenizer to tokenize one or more words or phrases included in the textual question data, where the one or more tokenized words or phrases may represent the parsed question. In some implementations, the knowledge platform may utilize natural language processing to parse the one or more words or phrases included in the textual question data into the one or more tokenized words or phrases.

As shown in FIG. 1I, and by reference number 150, the knowledge platform may perform natural language processing on the parsed question to identify subject matter of the question. For example, the knowledge platform may perform lower case conversion, stop word removal, punctuation removal, lemmatization, and/or the like on the parsed question in order to identify the subject matter of the question. In some implementations, the knowledge platform may perform natural language processing on the parsed question in a manner similar to the natural language processing described above in connection with FIG. 1C. For example, when performing the natural language processing on the parsed question, the knowledge platform may remove punctuations from the parsed question, may tokenize words in the parsed question to enable analysis of the words, may determine most frequent keywords utilized in the parsed question, may convert the parsed question into machine-readable text, may split the machine-readable text into an array of words, may split the array of words into sequences of contiguous words, may calculate word scores for the sequences of contiguous words, and/or the like.

As shown in FIG. 1J, and by reference number 155, the knowledge platform may perform a search of the knowledge graph, based on the subject matter of the question, to identify documents and first document scores for the documents. For example, the knowledge platform may perform the search based on the subject matter of the question and using a search engine (e.g., an elastic search engine) configured to perform the search of the knowledge graph. Based on performing the search, the knowledge platform may identify the documents.

In some implementations, the knowledge platform may score the documents (e.g., with the first document scores) based on relevancies of the documents to the subject matter of the question. For example, the knowledge platform may determine a relatively high score (e.g., as being likely to be relevant to the subject matter of the question) for a document that includes a threshold quantity of words or phrases determined to be the same as, similar to, and/or representative of the subject matter of the question. In contrast, the knowledge platform may determine a relatively low score (e.g., as being unlikely to be relevant to the subject matter of the question) for a document that includes another threshold quantity of words or phrases determined to be different than and/or not representative of the subject matter of the question. For example, as further shown in FIG. 1J, the knowledge platform may determine a first document score (e.g., first score 1) for a first document (e.g., document 1), another first document score (e.g., first score 2) for a second document (e.g., document 2), . . . , an Nth first document score (e.g., first score N) for an Nth document (e.g., document N), and/or the like.

As shown in FIG. 1K, and by reference number 165, the knowledge platform may identify a set of the documents that satisfy a threshold first document score (e.g., a threshold quantity of the documents, a threshold first score value, a threshold percentage of the documents, and/or the like). For example, the knowledge platform may identify a subset of the documents (e.g., document 1 through document D) that have first scores (e.g., first score 1 through first score D, respectively) that satisfy the threshold first document score. Additionally, or alternatively, the knowledge platform may identify, from the documents, a single document with a highest first document score. Additionally, or alternatively, the knowledge platform may identify a set of the documents with a greatest threshold percentage of first document scores. For example, the knowledge platform may identify a set of the documents with a greatest 5%, 10%, 15%, and/or the like of first document scores.

As shown in FIG. 1L, and by reference number 170, the knowledge platform may determine a second document score for each document, of the set of the documents, based on parsed text of each document (e.g., in the set of the documents) and based on the subject matter of the question. In some implementations, the knowledge platform may parse each document to generate the parsed text using a technique similar to the technique described above in connection with FIG. 1B. For example, the knowledge platform may utilize a parser API to parse each document and to generate the parsed text. The knowledge platform may utilize a tokenizer to tokenize one or more words or phrases included in each document, where the one or more tokenized words or phrases may represent the parsed text. In some implementations, the knowledge platform may utilize natural language processing to parse the one or more words or phrases included in each document into the one or more tokenized words or phrases.

In some implementations, the second document scores may include term frequency-inverse document frequency (TF-IDF) scores. A TF-IDF score may include a weight used in information retrieval and text mining, and used by search engines in scoring and ranking a document's relevance given a query. The TF-IDF score may include a statistical measure used to evaluate how important a word is to a document in a collection or a corpus. The importance increases proportionally to a quantity of times a word appears in the document but may be offset by a frequency of the word in the corpus. In some implementations, the knowledge platform may scale up a second document score caused by rare words and/or may scale down a second document score caused by frequently appearing words. In some implementations, the knowledge platform may weight the second document scores. For example, the knowledge platform may apply greater weights to second document scores caused by word trigrams, word bigrams, and/or the like.

As shown in FIG. 1M, and by reference number 175, the knowledge platform may determine an answer to the question based on the second document scores determined for the set of the documents. For example, the knowledge platform may determine the answer to the question based on a greatest second document score, based on second document scores that satisfy a particular threshold, based on a greatest percentage of document scores, and/or the like. In some implementations, if the knowledge platform does not identify any documents sufficiently relevant to the question received (e.g., does not identify any documents that satisfy a threshold first score or a threshold second score, a threshold percentage first score or a threshold percentage second score, and/or the like), the knowledge platform may determine one or more probable questions based on the original question. For example, the knowledge platform may perform a joined word detection function, a synonyms detection function, and/or the like to determine the one or more probable questions based on the original question.

In some implementations, the knowledge platform may determine the answer to the question based on a single document from the set of the documents (e.g., a document with a greatest second document score), based on a combination of documents from the set of the documents (e.g., documents with greatest second document scores), and/or the like. The knowledge platform may formulate the answer based on information contained in the single document and/or based on information contained in the combination of documents. Alternatively, or additionally, the knowledge platform may provide the single document and/or the combination of documents as the answer to the question.

In some implementations, upon receiving a question associated with the application or the system, the knowledge platform may perform a first search of the knowledge graph based on the question, and may determine that the first search failed to identify an answer to the question. The knowledge platform may generate a revised question based on determining that the first search failed to identify the answer to the question, and may perform a second search of the knowledge graph, based on the revised question, to determine the answer.

As shown in FIG. 1N, and by reference number 180, the knowledge platform may perform one or more actions based on the answer. In some implementations, the one or more actions may include the knowledge platform providing, for display, the answer to the question and the set of the documents associated with the answer. For example, the knowledge platform may provide, for display, the answer determined based on the document with a greatest second document score, as described above. Additionally, or alternatively, the knowledge platform may provide, for display, a set of best possible answers based on the documents with greatest second document scores, and may enable the user to select the answer from the best possible answers. In this way, the knowledge platform may enable the user to review and understand information associated with the application or the system, thereby conserving computing resources (e.g., processing resources, memory resources, communication resources, and/or the like), networking resources, and/or the like that would otherwise be wasted in searching, investigating, and/or interpreting materials that may lack documentation or other information, may come from multiple sources, may be excessive in volume, and/or the like.

In some implementations, the one or more actions may include the knowledge platform automatically connecting a subject matter expert with a user that posed the question. For example, upon receiving a question associated with the application or the system, the knowledge platform may perform a search of the knowledge graph based on the question, and may determine that the search failed to identify an answer to the question. The knowledge platform may automatically connect a first client device, associated with a subject matter expert that can provide the answer, and a second client device associated with the user that posed the question, and may monitor information exchanged between the first client device and the second client device. The knowledge platform may update the knowledge graph based on the information exchanged between the first client device and the second client device. In this way, the knowledge platform may enable the user to access subject matter expertise when the knowledge platform cannot automatically provide a sufficient answer.

In some implementations, the one or more actions may include the knowledge platform generating one or more analytics based on the answer and/or a response to the answer. For example, the knowledge platform may continually monitor data received from the client devices and/or server devices to identify information, and may generate the one or more analytics based on the information. The information may include a quantity of questions answered by the knowledge platform, a quantity of responses to answers received by the knowledge platform, top searched questions, a quantity of correct answers, a quantity of incorrect answers, a quantity of subject matter expert connects and/or subject matter expert availability statistics, a quantity of times a subject matter expert revised data (e.g., corrected topic names) in the knowledge graph, and/or the like. In this way, the knowledge platform may automatically and effectively monitor the quality and effectiveness of the answers, thereby conserving resources that would otherwise be wasted in investigating questions, identifying additional answers, and/or the like.

In some implementations, the one or more actions may include the knowledge platform automatically dispatching a robot, an unmanned vehicle, or a technician to the user that posed the question. For example, if the answer to the question requires correcting hardware in the system, the knowledge platform may automatically dispatch the robot, the unmanned vehicle, and/or the technician to perform the correction. In this way, the knowledge platform may automatically implement a correction to a problem identified in the question, thereby conserving resources that would otherwise be wasted in arranging for the problem to be corrected, to procure personnel and/or other resources, to schedule actions to resolve the problem, and/or the like.

In some implementations, the one or more actions may include the knowledge platform updating the knowledge graph based on the answer and/or a response to the answer. For example, the knowledge platform may receive additional unstructured data associated with the application or the system, and may update the knowledge graph based on the additional unstructured data associated with the application or the system. In some implementations, the knowledge platform may update the knowledge graph based on the additional unstructured data. In some implementations, the knowledge platform may update the knowledge graph based on responses indicating that answers were incorrect. In this way, the knowledge platform may automatically improve the quality of answers provided for future questions of users, thereby conserving resources that would otherwise be required to assess and improve the knowledge platform.

In some implementations, the one or more actions may include the knowledge platform retraining the clustering model and/or the classification model based on the answer and/or a response to the answer. In this way, the knowledge platform may improve the accuracy of the clustering model and/or the classification model in processing the processed textual data and the topical data (e.g., may improve topic identification and categorization, quality of answers to user questions, and/or the like), which may improve speed and efficiency of the clustering model and/or the classification model and conserve computing resources, networking resources, and/or the like.

In this way, several different stages of the process for managing and extracting knowledge for an application or a system are automated via artificial intelligence models, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes artificial intelligence models to manage and extract knowledge for an application or a system in the manner described herein. Finally, the process for utilizing artificial intelligence models to manage and extract knowledge for an application or a system conserves computing resources, networking resources, and/or the like that would otherwise be wasted in executing the application to understand features of the application/system, reviewing large quantities of difficult to understand documentation, attempting to piece application/system documents together to understand the application/system, and/or like.

As indicated above, FIGS. 1A-1N are provided merely as examples. Other examples may differ from what is described with regard to FIGS. 1A-1N.

Figure 2:
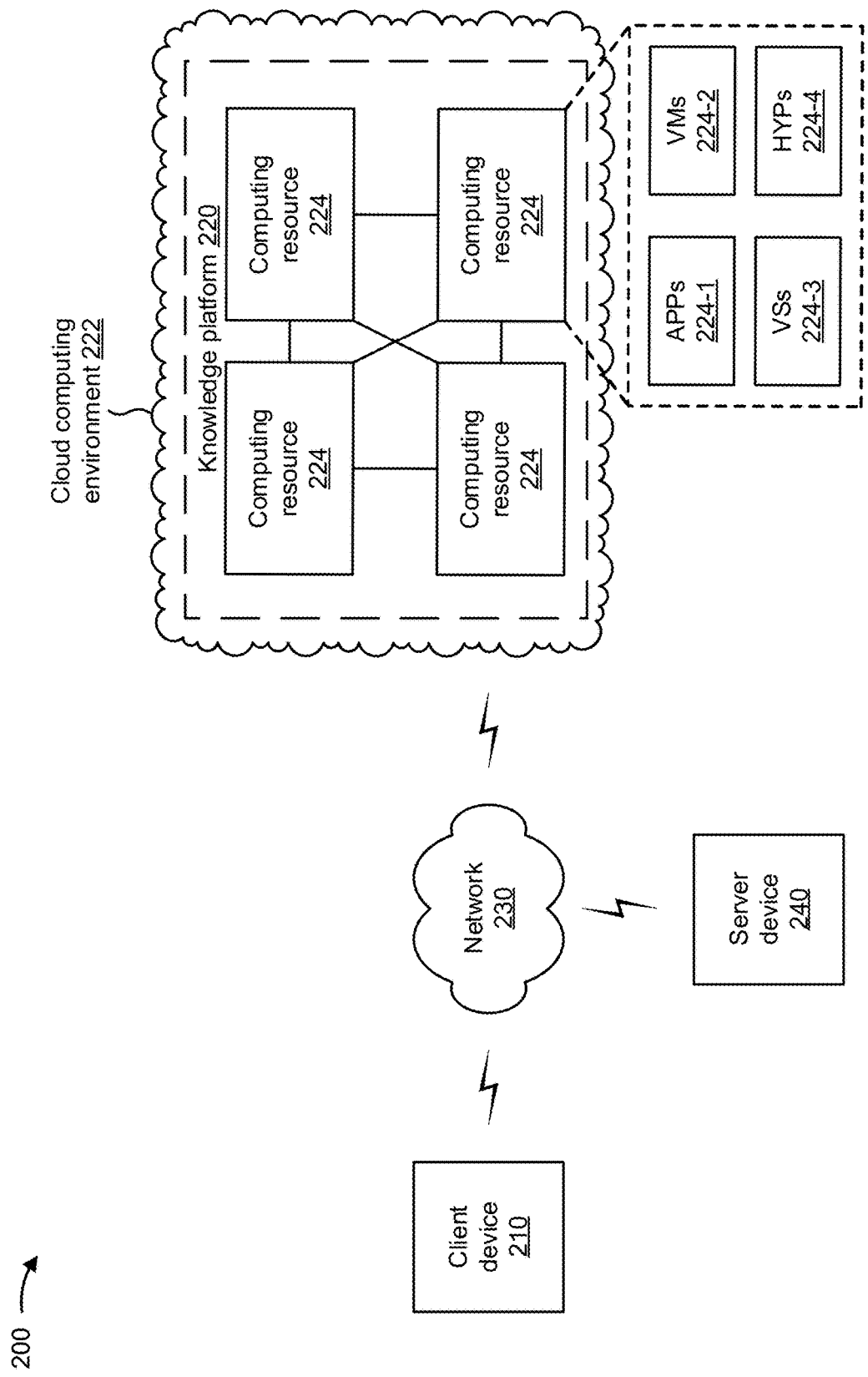
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a knowledge platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to knowledge platform 220 and/or server device 240.

Knowledge platform 220 includes one or more devices that utilize artificial intelligence models to manage and extract knowledge for an application or a system. In some implementations, knowledge platform 220 may be designed to be modular such that certain software components may be swapped in or out depending on a particular need. As such, knowledge platform 220 may be easily and/or quickly reconfigured for different uses. In some implementations, knowledge platform 220 may receive information from and/or transmit information to one or more client devices 210 and/or server devices 240.

In some implementations, as shown, knowledge platform 220 may be hosted in a cloud computing environment 222. Notably, while implementations described herein describe knowledge platform 220 as being hosted in cloud computing environment 222, in some implementations, knowledge platform 220 may not be cloud-based (i.e., may be implemented outside of a cloud computing environment) or may be partially cloud-based.

Cloud computing environment 222 includes an environment that hosts knowledge platform 220. Cloud computing environment 222 may provide computation, software, data access, storage, etc., services that do not require end-user knowledge of a physical location and configuration of system(s) and/or device(s) that hosts knowledge platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host knowledge platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with knowledge platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of knowledge platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device. In some implementations, server device 240 may receive information from and/or transmit information to client device 210 and/or knowledge platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
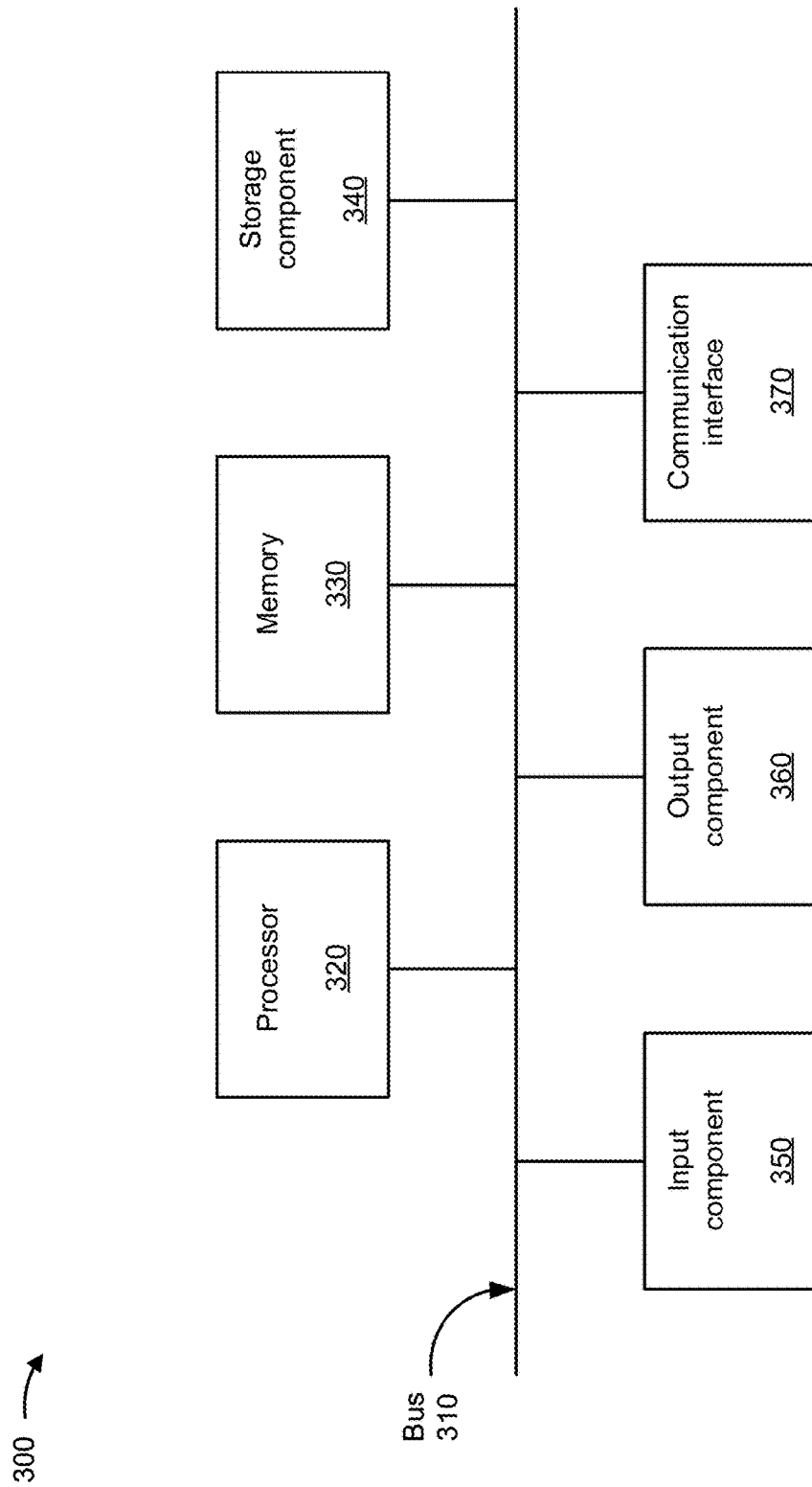
FIG. 3 is a diagram of example components of one or more devices of FIG. 2.

FIG. 3 is a diagram of example components of a device 300. Device 300 may correspond to client device 210, knowledge platform 220, computing resource 224, and/or server device 240. In some implementations, client device 210, knowledge platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
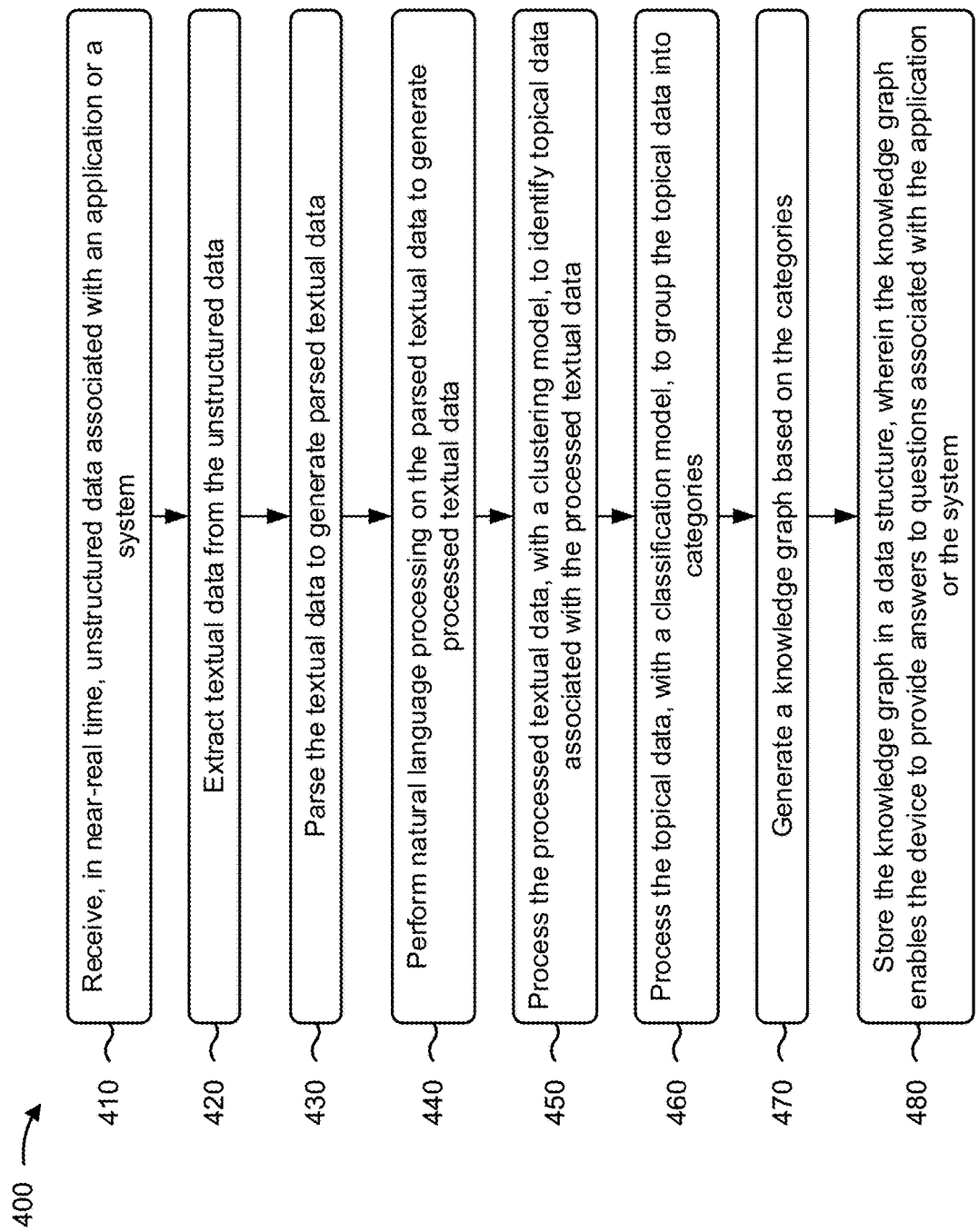
FIGS. 4-6 are flow charts of example processes for utilizing artificial intelligence models to manage and extract knowledge for an application or a system.

FIG. 4 is a flow chart of an example process 400 for utilizing artificial intelligence models to manage and extract knowledge for an application or a system. In some implementations, one or more process blocks of FIG. 4 may be performed by a device (e.g., knowledge platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving, in near-real time, unstructured data associated with an application or a system (block 410). For example, the device (e.g., using computing resource 224, processor 320, communication interface 370, and/or the like) may receive, in near-real time, unstructured data associated with an application or a system, as described above.

As further shown in FIG. 4, process 400 may include extracting textual data from the unstructured data (block 420). For example, the device (e.g., using computing resource 224, processor 320, memory 330, and/or the like) may extract textual data from the unstructured data, as described above.

As further shown in FIG. 4, process 400 may include parsing the textual data to generate parsed textual data (block 430). For example, the device (e.g., using computing resource 224, processor 320, component 340, and/or the like) may parse the textual data to generate parsed textual data, as described above.

As further shown in FIG. 4, process 400 may include performing natural language processing on the parsed textual data to generate processed textual data (block 440). For example, the device (e.g., using computing resource 224, processor 320, memory 330, storage component 340, and/or the like) may perform natural language processing on the parsed textual data to generate processed textual data, as described above.

As further shown in FIG. 4, process 400 may include processing the processed textual data, with a clustering model, to identify topical data associated with the processed textual data (block 450). For example, the device (e.g., using computing resource 224, processor 320, memory 330, and/or the like) may process the processed textual data, with a clustering model, to identify topical data associated with the processed textual data, as described above.

As further shown in FIG. 4, process 400 may include processing the topical data, with a classification model, to group the topical data into categories (block 460). For example, the device (e.g., using computing resource 224, processor 320, storage component 340, and/or the like) may process the topical data, with a classification model, to group the topical data into categories, as described above.

As further shown in FIG. 4, process 400 may include generating a knowledge graph based on the categories (block 470). For example, the device (e.g., using computing resource 224, processor 320, memory 330, storage component 340, and/or the like) may generate a knowledge graph based on the categories, as described above.

As further shown in FIG. 4, process 400 may include storing the knowledge graph in a data structure, wherein the knowledge graph enables the device to provide answers to questions associated with the application or the system (block 480). For example, the device (e.g., using computing resource 224, processor 320, storage component 340, communication interface 370, and/or the like) may store the knowledge graph in a data structure, as described above. In some implementations, the knowledge graph may enable the device to provide answers to questions associated with the application or the system.

Process 400 may include additional implementations, such as any single implementation or any combination of implementations described below and/or in connection with one or more other processes described elsewhere herein.

In a first implementation, process 400 may include receiving a question associated with the application or the system, performing a search of the knowledge graph, based on the question, to determine an answer to the question, and performing one or more actions based on the answer to the question.

In a second implementation, alone or in combination with the first implementation, process 400 may include extracting textual question data from the question; parsing the textual question data to generate a parsed question; and performing natural language processing on the parsed question to identify an subject matter of the question, wherein performing the search of the knowledge graph may include performing a search of the knowledge graph, based on the subject matter of the question, to identify documents and first document scores; identifying a set of the documents that satisfy a threshold first document score; determining a second document score for each document, of the set of the documents, based on parsed text of each document and the subject matter of the question; and determining the answer to the question based on the second document scores determined for the set of the documents.

In a third implementation, alone or in combination with one or more of the first and second implementations, performing the one or more actions may include providing, for display, the answer to the question; automatically connecting a first client device, associated with a subject matter expert for the answer, and a second client device associated with a user that posed the question; or generating one or more analytics based on the answer or based on a response to the answer.

In a fourth implementation, alone or in combination with one or more of the first through third implementations, performing the one or more actions may include automatically dispatching a robot, an unmanned vehicle, or a technician to a location of a user that posed the question; updating the knowledge graph based on the answer or based on a response to the answer; or retraining the clustering model or the classification model based on the answer or based on a response to the answer.

In a fifth implementation, alone or in combination with one or more of the first through fourth implementations, the second document scores may include term frequency-inverse document frequency scores.

In a sixth implementation, alone or in combination with one or more of the first through fifth implementations, the unstructured data may include video data associated with the application or the system, image data associated with the application or the system, audio data associated with the application or the system, conversation data associated with the application or the system, documents associated with the application or the system, source code associated with the application or the system, emails associated with the application or the system, or chat transcripts associated with the application or the system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
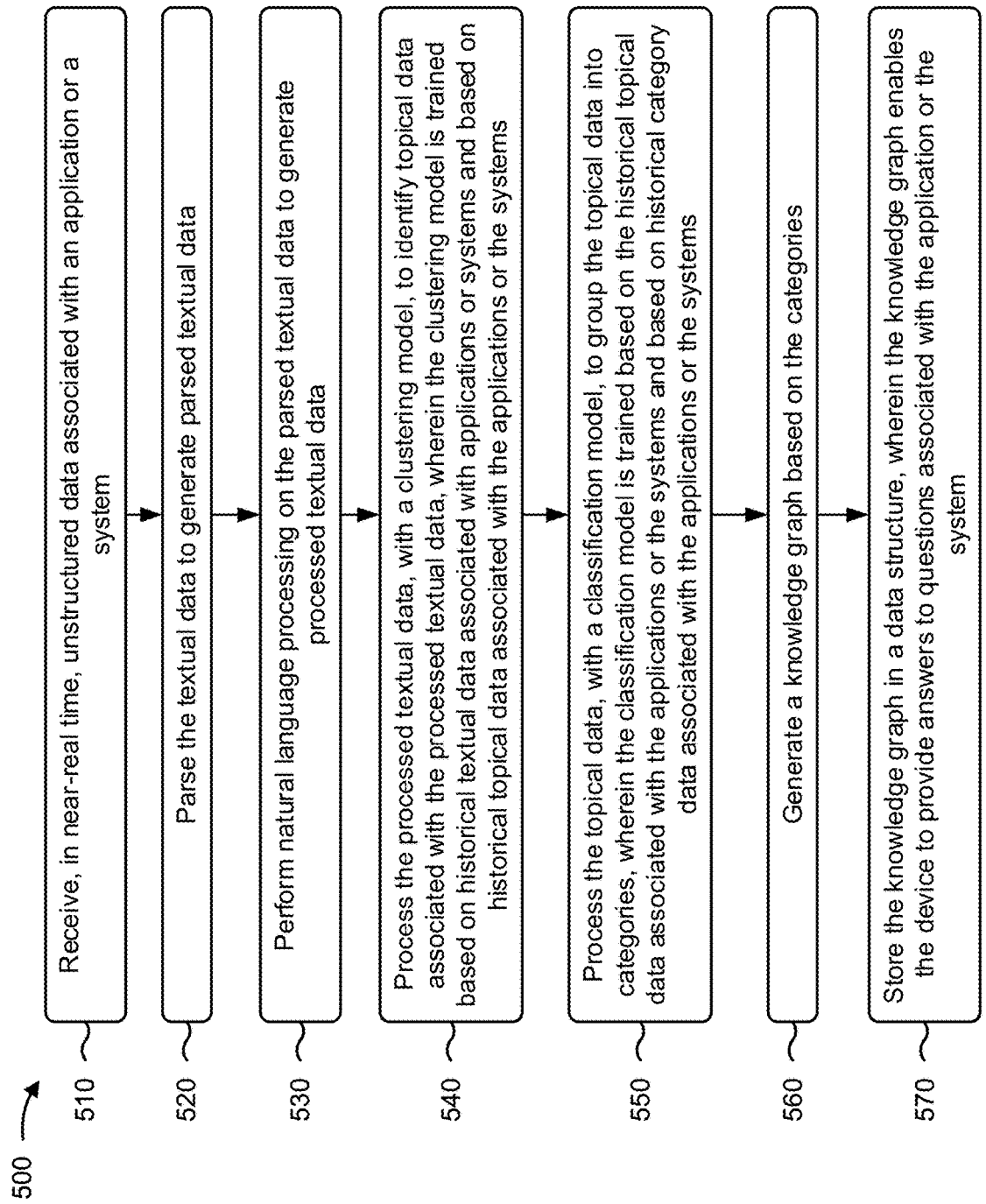

FIG. 5 is a flow chart of an example process 500 for utilizing artificial intelligence models to manage and extract knowledge for an application or a system. In some implementations, one or more process blocks of FIG. 5 may be performed by a device (e.g., knowledge platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving, in near-real time, unstructured data associated with an application or a system (block 510). For example, the device (e.g., using computing resource 224, processor 320, communication interface 370, and/or the like) may receive, in near-real time, unstructured data associated with an application or a system, as described above.

As further shown in FIG. 5, process 500 may include parsing the textual data to generate parsed textual data (block 520). For example, the device (e.g., using computing resource 224, processor 320, memory 330, and/or the like) may parse the textual data to generate parsed textual data, as described above.

As further shown in FIG. 5, process 500 may include performing natural language processing on the parsed textual data to generate processed textual data (block 530). For example, the device (e.g., using computing resource 224, processor 320, storage component 340, and/or the like) may perform natural language processing on the parsed textual data to generate processed textual data, as described above.

As further shown in FIG. 5, process 500 may include processing the processed textual data, with a clustering model, to identify topical data associated with the processed textual data, wherein the clustering model is trained based on historical textual data associated with applications or systems and based on historical topical data associated with the applications or the systems (block 540). For example, the device (e.g., using computing resource 224, processor 320, memory 330, storage component 340, and/or the like) may process the processed textual data, with a clustering model, to identify topical data associated with the processed textual data, as described above. In some implementations, the clustering model may be trained based on historical textual data associated with applications or systems and based on historical topical data associated with the applications or the systems.

As further shown in FIG. 5, process 500 may include processing the topical data, with a classification model, to group the topical data into categories, wherein the classification model is trained based on the historical topical data associated with the applications or the systems and based on historical category data associated with the applications or the systems (block 550). For example, the device (e.g., using computing resource 224, processor 320, memory 330, and/or the like) may process the topical data, with a classification model, to group the topical data into categories, as described above. In some implementations, the classification model may be trained based on the historical topical data associated with the applications or the systems and based on historical category data associated with the applications or the systems.

As further shown in FIG. 5, process 500 may include generating a knowledge graph based on the categories (block 560). For example, the device (e.g., using computing resource 224, processor 320, storage component 340, and/or the like) may generate a knowledge graph based on the categories, as described above.

As further shown in FIG. 5, process 500 may include storing the knowledge graph in a data structure, wherein the knowledge graph enables the device to provide answers to questions associated with the application or the system (block 570). For example, the device (e.g., using computing resource 224, processor 320, memory 330, communication interface 370, and/or the like) may store the knowledge graph in a data structure, as described above. In some implementations, the knowledge graph may enable the device to provide answers to questions associated with the application or the system.

Process 500 may include additional implementations, such as any single implementation or any combination of implementations described below and/or in connection with one or more other processes described elsewhere herein.

In a first implementation, the knowledge graph may include parent nodes representing the categories, and child nodes representing topics included in the topical data, where each child node may be connected to one or more parent nodes.

In a second implementation, alone or in combination with the first implementation, process 500 may include receiving a question associated with the application or the system;

performing a first search of the knowledge graph based on the question; determining that the first search failed to identify an answer to the question; generating a revised question based on determining that the first search failed to identify the answer to the question; performing a second search of the knowledge graph, based on the revised question, to determine the answer; and performing one or more actions based on the answer.

In a third implementation, alone or in combination with one or more of the first and second implementations, process 500 may include receiving a question associated with the application or the system; performing a search of the knowledge graph based on the question; determining that the search failed to identify an answer to the question; automatically connecting a first client device, associated with a subject matter expert for the answer, and a second client device associated with a user that posed the question; monitoring information exchanged between the first client device and the second client device; and updating the knowledge graph based on the information exchanged between the first client device and the second client device.

In a fourth implementation, alone or in combination with one or more of the first through third implementations, process 500 may include receiving additional unstructured data associated with the application or the system, and updating the knowledge graph based on the additional unstructured data associated with the application or the system.

In a fifth implementation, alone or in combination with one or more of the first through fourth implementations, process 500 may include extracting additional textual data from the additional unstructured data; parsing the additional textual data to generate parsed additional textual data; performing natural language processing on the parsed additional textual data to generate processed additional textual data; processing the processed additional textual data, with the clustering model, to identify additional topical data associated with the processed additional textual data; processing the additional topical data, with the classification model, to group the additional topical data into additional categories; and updating the knowledge graph based on the additional categories.

In a sixth implementation, alone or in combination with one or more of the first through fifth implementations, process 500 may include utilizing the knowledge graph to provide the answers to the questions associated with the application or the system; monitoring the answers to the questions and responses to the answers; and updating the knowledge graph based on the responses to the answers.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
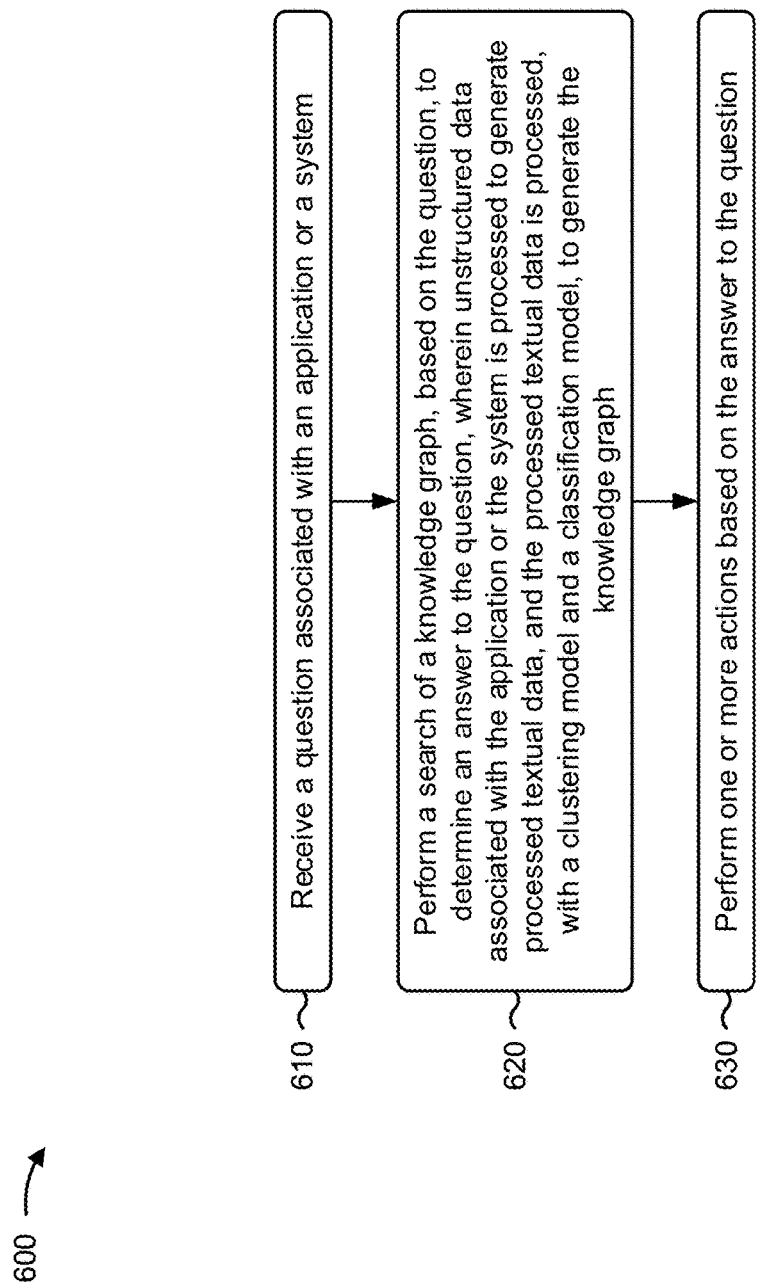

FIG. 6 is a flow chart of an example process 600 for utilizing artificial intelligence models to manage and extract knowledge for an application or a system. In some implementations, one or more process blocks of FIG. 6 may be performed by a device (e.g., knowledge platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include receiving a question associated with an application or a system (block 610). For example, the device (e.g., using computing resource 224, processor 320, communication interface 370, and/or the like) may receive a question associated with an application or a system, as described above.

As further shown in FIG. 6, process 600 may include performing a search of a knowledge graph, based on the question, to determine an answer to the question, wherein unstructured data associated with the application or the system is processed to generate processed textual data, and the processed textual data is processed, with a clustering model and a classification model, to generate the knowledge graph (block 620). For example, the device (e.g., using computing resource 224, processor 320, memory 330, and/or the like) may perform a search of a knowledge graph, based on the question, to determine an answer to the question, as described above. In some implementations, unstructured data associated with the application or the system may be processed to generate processed textual data, and the processed textual data may be processed, with a clustering model and a classification model, to generate the knowledge graph.

As further shown in FIG. 6, process 600 may include performing one or more actions based on the answer to the question (block 630). For example, the device (e.g., using computing resource 224, processor 320, memory 330, storage component 340, communication interface 370, and/or the like) may perform one or more actions based on the answer to the question, as described above.

Process 600 may include additional implementations, such as any single implementation or any combination of implementations described below and/or in connection with one or more other processes described elsewhere herein.

In a first implementation, process 600 may include extracting textual question data from the question; parsing the textual question data to generate a parsed question; performing natural language processing on the parsed question to identify subject matter of the question; performing a search of the knowledge graph, based on the subject matter of the question, to identify documents and first document scores; identifying a set of the documents that satisfy a threshold first document score; determining a second document score for each document, of the set of the documents, based on parsed text of each document and the subject matter of the question; and determining the answer to the question based on the second document scores determined for the set of the documents.

In a second implementation, alone or in combination with the first implementation, performing the one or more actions may include providing, for display, the answer to the question; automatically connecting a first client device, associated with a subject matter expert for the answer, and a second client device associated with a user that posed the question; or generating one or more analytics based on the answer or based on a response to the answer.

In a third implementation, alone or in combination with one or more of the first and second implementations, performing the one or more actions may include automatically dispatching a robot, an unmanned vehicle, or a technician to a location of a user that posed the question; updating the knowledge graph based on the answer or based on a response to the answer; or retraining the clustering model or the classification model based on the answer or based on a response to the answer.

In a fourth implementation, alone or in combination with one or more of the first through third implementations, process 600 may include receiving another question associated with the application or the system; performing a first search of the knowledge graph based on the other question; determining that the first search failed to identify another answer to the other question; generating a revised question based on determining that the first search failed to identify the other answer to the other question; performing a second search of the knowledge graph, based on the revised question, to determine the other answer; and performing the one or more actions based on the other answer.

In a fifth implementation, alone or in combination with one or more of the first through fourth implementations, process 600 may include receiving additional unstructured data associated with the application or the system, and updating the knowledge graph based on the additional unstructured data associated with the application or the system.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and in near-real time, unstructured data associated with an application or a system;
   extracting, by the device, textual data from the unstructured data;
   parsing, by the device, the textual data to generate parsed textual data;
   performing, by the device, natural language processing on the parsed textual data to generate processed textual data;
   processing, by the device, the processed textual data, with a clustering model, to identify topical data associated with the processed textual data;
   processing, by the device, the topical data, with a classification model, to group the topical data into categories;
   generating, by the device, a knowledge graph based on the categories;
   storing, by the device, the knowledge graph in a data structure;
   receiving, by the device, a question associated with the application or the system;
   determining, by the device, that a search of the knowledge graph failed to identify an answer to the question;
   automatically connecting, by the device, a first client device, associated with a subject matter expert for the answer to the question, and a second client device associated with the question based on determining that the search of the knowledge graph failed to identify the answer to the question,
      wherein the first client device and the second client device are automatically connected based on the search of the knowledge graph failing to identify the answer to the question;
   monitoring, by the device, information exchanged between the first client device and the second client device;
   updating, by the device, the knowledge graph based on the information exchanged between the first client device and the second client device; and
   generating, by the device, one or more analytics based on a quantity of times the subject matter expert revised the topical data in the knowledge graph.

2. The method of claim 1, further comprising:
   receiving a second question associated with the application or the system;
   performing a search of the knowledge graph, based on the second question, to determine a second answer to the second question; and
   performing one or more actions based on the second answer to the second question.

3. The method of claim 2, further comprising:
   extracting textual question data from the second question;
   parsing the textual question data to generate a parsed question; and
   performing natural language processing on the parsed question to identify subject matter of the second question,
      wherein performing the search of the knowledge graph comprises:
         performing a search of the knowledge graph, based on the subject matter of the question, to identify documents and first document scores,
         identifying a set of the documents that satisfy a threshold first document score,
         determining a second document score for each document, of the set of the documents, based on parsed text of each document and the subject matter of the second question, and determining the second answer to the question based on the second document score determined for each document of the set of the documents.

4. The method of claim 2, wherein performing the one or more actions comprises:
   providing, for display, the second answer to the second question.

5. The method of claim 2, wherein performing the one or more actions comprises one or more of:
   automatically dispatching a robot, an unmanned vehicle, or a technician to a location of a user that posed the question;
   updating the knowledge graph based on the second answer or based on a response to the second answer; or
   retraining the clustering model or the classification model based on the answer or based on a response to the second answer.

6. The method of claim 3, wherein the second document score for each document includes term frequency-inverse document frequency scores.

7. The method of claim 1, wherein the unstructured data includes one or more of:
   video data associated with the application or the system,
   image data associated with the application or the system,
   audio data associated with the application or the system,
   conversation data associated with the application or the system,
   documents associated with the application or the system,
   source code associated with the application or the system,
   emails associated with the application or the system, or
   chat transcripts associated with the application or the system.

8. A device, comprising:
   one or more memories; and
   one or more processors, communicatively coupled to the one or more memories, configured to:
      receive, in near-real time, unstructured data associated with an application or a system;
      extract textual data from the unstructured data;
      parse the textual data to generate parsed textual data;
      perform natural language processing on the parsed textual data to generate processed textual data;
      process the processed textual data, with a clustering model, to identify topical data associated with the processed textual data,
         wherein the clustering model is trained based on historical textual data associated with applications or systems and based on historical topical data associated with the applications or the systems;
      process the topical data, with a classification model, to group the topical data into categories,
         wherein the classification model is trained based on the historical topical data associated with the applications or the systems and based on historical category data associated with the applications or the systems;
      generate a knowledge graph based on the categories;
      store the knowledge graph in a data structure;
      receive a question associated with the application or the system;
      determine that a search of the knowledge graph failed to identify an answer to the question;
      automatically connect a first client device, associated with a subject matter expert for the answer to the question, and a second client device associated with the question based on determining that the search of the knowledge graph failed to identify the answer to the question,
         wherein the first client device and the second client device are automatically connected based on the search of the knowledge graph failing to identify the answer to the question;
      monitor information exchanged between the first client device and the second client device;
      update the knowledge graph based on the information exchanged between the first client device and the second client device; and
      generate one or more analytics based on a quantity of times the subject matter expert revised the topical data in the knowledge graph.

9. The device of claim 8, wherein the knowledge graph includes:
   parent nodes representing the categories, and
   child nodes representing topics included in the topical data,
      wherein each child node is connected to one or more parent nodes.

10. The device of claim 8, wherein the one or more processors are further configured to:
   perform a first search of the knowledge graph based on the question;
   determine that the first search failed to identify an answer to the question;
   generate a revised question based on determining that the first search failed to identify the answer to the question;
   perform a second search of the knowledge graph, based on the revised question, to determine the answer to the question; and
   perform one or more actions based on the answer to the question.

11. The device of claim 8, wherein the one or more processors are further configured to:
   receive additional unstructured data associated with the application or the system; and
   update the knowledge graph based on the additional unstructured data associated with the application or the system.

12. The device of claim 11, wherein the one or more processors, when updating the knowledge graph, are configured to:
   extract additional textual data from the additional unstructured data;
   parse the additional textual data to generate parsed additional textual data;
   perform natural language processing on the parsed additional textual data to generate processed additional textual data;
   process the processed additional textual data, with the clustering model, to identify additional topical data associated with the processed additional textual data;
   process the additional topical data, with the classification model, to group the additional topical data into additional categories; and
   update the knowledge graph based on the additional categories.

13. The device of claim 8, wherein the one or more processors are further configured to:
   automatically dispatch a robot, an unmanned vehicle, or a technician to a location of a user that posed the question; or retrain the clustering model or the classification model based on the answer to the question or based on a response to the answer to the question.

14. The device of claim 8, wherein the one or more processors are further configured to:
receive a second question associated with the application or the system;
perform a search of the knowledge graph, based on the second question, to determine a second answer to the second question; and
perform one or more actions based on the second answer to the second question.

15. A non-transitory computer-readable medium storing instructions, the instructions comprising:
one or more instructions that, when executed by one or more processors of a device, cause the one or more processors to:
receive a question associated with an application or a system;
perform a search of a knowledge graph, based on the question, to determine an answer to the question,
wherein unstructured data associated with the application or the system is processed to generate processed textual data, and the processed textual data is processed, with a clustering model and a classification model, to generate the knowledge graph;
determine that the search of the knowledge graph failed to identify an answer to the question;
automatically connect a first client device, associated with a subject matter expert for the answer to the question, and a second client device associated with the question based on the search of the knowledge graph failing to answer the question based on determining that the search of the knowledge graph failed to identify the answer to the question;
monitor information exchanged between the first client device and the second client device;
perform one or more actions based on the information exchanged between the first client device and the second client device;
update the knowledge graph based on the information exchanged between the first client device and the second client device; and
generate one or more analytics based on a quantity of times the subject matter expert revised data in the knowledge graph.

16. The non-transitory computer-readable medium of claim 15, wherein the instructions further comprise:
one or more instructions that, when executed by the one or more processors, cause the one or more processors to:
receive a second question associated with the application or the system;
extract textual question data from the second question;
parse the textual question data to generate a parsed question; and
perform natural language processing on the parsed question to identify subject matter of the second question,
wherein the one or more instructions, that cause the one or more processors to perform the search of the knowledge graph, cause the one or more processors to:
perform a search of the knowledge graph, based on the subject matter of the question, to identify documents and first document scores,
identify a set of the documents that satisfy a threshold first document score,
determine a second document score for each document, of the set of the documents, based on parsed text of each document and the subject matter of the second question, and
determine a second answer to the second question based on the second document score determined for each document of the set of the documents.

17. The non-transitory computer-readable medium of claim 15, wherein the one or more instructions, that cause the one or more processors to perform the one or more actions, cause the one or more processors to one or more of:
provide, for display, the answer to the question.

18. The non-transitory computer-readable medium of claim 15, wherein the one or more instructions, that cause the one or more processors to perform the one or more actions, cause the one or more processors to one or more of:
automatically dispatch a robot, an unmanned vehicle, or a technician to a location of a user that posed the question;
or
retrain the clustering model or the classification model based on the answer to the question or based on a response to the answer to the question.

19. The non-transitory computer-readable medium of claim 15, wherein the instructions further comprise:
one or more instructions that, when executed by the one or more processors, cause the one or more processors to:
receive another question associated with the application or the system;
perform a first search of the knowledge graph based on the other question;
determine that the first search failed to identify another answer to the other question;
generate a revised question based on determining that the first search failed to identify the other answer to the other question;
perform a second search of the knowledge graph, based on the revised question, to determine the other answer to the other question; and
perform the one or more actions based on the other answer to the other question.

20. The non-transitory computer-readable medium of claim 15, wherein the instructions further comprise:
one or more instructions that, when executed by the one or more processors, cause the one or more processors to:
receive additional unstructured data associated with the application or the system; and
update the knowledge graph based on the additional unstructured data associated with the application or the system.

* * * * *